United States Patent [19]
Smith, Sr. et al.

[11] Patent Number: 6,108,425
[45] Date of Patent: Aug. 22, 2000

[54] METHOD AND APPARATUS FOR CONTROLLING THE CONFIGURATION OF A CRYPTOGRAPHIC PROCESSOR

[75] Inventors: Ronald M. Smith, Sr., Wappingers Falls; Edward J. D'Avignon, Kingston, both of N.Y.; Robert S. DeBellis, Raleigh, N.C.; Randall J. Easter, Poughquag, N.Y.; Lucina L. Green, Verbank, N.Y.; Michael J. Kelly, Poughkeepsie, N.Y.; Vincent A. Spano, Poughkeepsie, N.Y.; Phil Chi-Chung Yeh, Poughkeepsie, N.Y.

[73] Assignee: International Business Machines Corporation, Armonk, N.Y.

[21] Appl. No.: 08/884,721

[22] Filed: Jun. 30, 1997

[51] Int. Cl.[7] .................................................. H04L 9/30
[52] U.S. Cl. .............................. 380/277; 380/274
[58] Field of Search ........................ 380/21, 25, 274, 380/277

[56] References Cited

U.S. PATENT DOCUMENTS

| | | |
|---|---|---|
| 4,405,829 | 9/1983 | Rivest et al. . |
| 4,755,940 | 7/1988 | Brachtl et al. . |
| 5,142,578 | 8/1992 | Matyas et al. ............................ 380/21 |
| 5,297,208 | 3/1994 | Schlafly et al. .......................... 380/49 |
| 5,572,590 | 11/1996 | Chess . |
| 5,724,425 | 3/1998 | Chang et al. ............................. 380/25 |
| 5,825,880 | 10/1998 | Sudia et al. .............................. 380/21 |

OTHER PUBLICATIONS

"Applied Cryptography" Second Edition, Protocols, Algorithms and Source Code in C, by B. Schneier, 1996, pp. 466–471.

"Efficient Methods for Two Party Entity Authentication and Key Exchange in a High Speed Environment" by E. Basturk et al., IBM Technical Disclosure Bulletin, vol. 38, No. 03, Mar. 1995.

"Message Replay Prevention Using A Previously Transmitted Random Number To Sequence The Messages" by W. C. Martin, IBM Technical Disclosure Bulletin, vol. 27, No. 3, Aug. 1984.

"Personal Verification and Message Authentication Using Personal Keys" by R. E. Lennon et al., IBM Technical Disclosure Bulletin, vol. 24, No. 12, May 1982.

"SNA Bind Security Enhancement" by R. E. Lennon et al., IBM Technical Disclosure Bulletin, vol. 26, No. 10A, Mar. 1984.

"Transaction Incrementing Message Authentication Key" by W. D. Hopkins, IBM Technical Disclosure Bulletin, vol. 26, No. 1, Jun. 1983.

"Efficient Methods for Two Party Entity Authentication . . . " vol. 38, No. 03, Mar. 1995.

"Applied Cryptography" by Bruce Schneier 1996.

*Primary Examiner*—Tod R. Swann
*Assistant Examiner*—Todd Jack
*Attorney, Agent, or Firm*—William A. Kinnaman, Jr.

[57] ABSTRACT

The capabilities of a cryptographic module are controlled by a crypto configuration control (CCC) register that is initialized by one or more self-signed commands that are preformulated and signed with the digital signature key of the crypto module itself. The crypto module accepts a self-signed command only if the self-signature can be validated using the signature verification key of the module. In one implementation, the final configuration is determined by a single self-signed command. In another implementation, a first self-signed command is used to create an temporary configuration that allows one or more initialization authorities to issue additional commands fixing the final configuration. The self-signed commands are maintained separately from the crypto module and are distributed to the end user either physically or electronically. After the self-signed commands have been created and the secret exponent has been embedded in a particular crypto module, all copies of the secret exponent external to the crypto module are destroyed.

3 Claims, 25 Drawing Sheets

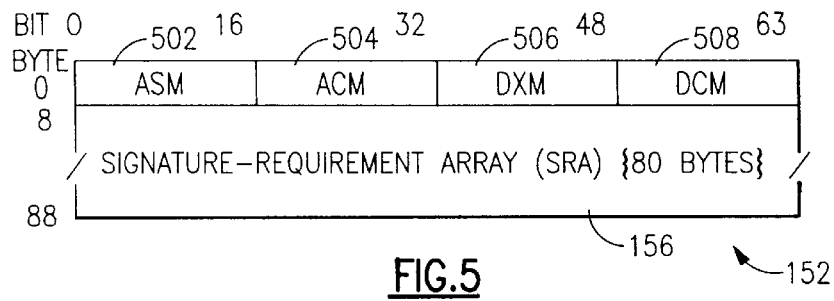
FIG.5
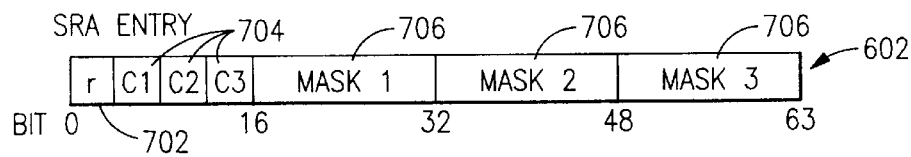
FIG.6
FIG.7

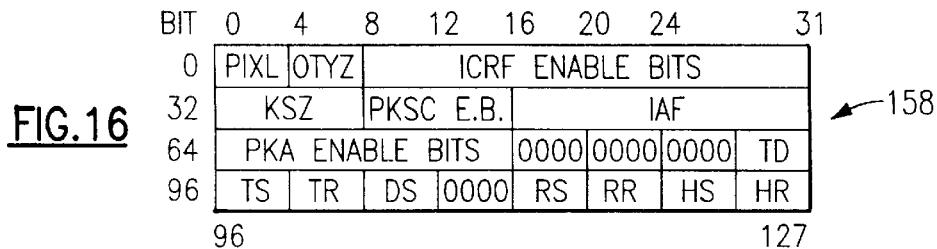

FIG. 16

| SIZE FIELD[1] | MAX MOD[2] | LEADING ZEROS REQUIRED IN MODULUS[3] | |
|---|---|---|---|
| | | IN BITS | IN DOUBLEWORDS |
| 0000 | $2^{64}$ | 960 | 15 |
| 0001 | $2^{128}$ | 896 | 14 |
| 0010 | $2^{192}$ | 832 | 13 |
| 0011 | $2^{256}$ | 768 | 12 |
| 0100 | $2^{320}$ | 704 | 11 |
| 0101 | $2^{384}$ | 640 | 10 |
| 0110 | $2^{448}$ | 576 | 9 |
| 0111 | $2^{512}$ | 512 | 8 |
| 1000 | $2^{576}$ | 448 | 7 |
| 1001 | $2^{640}$ | 384 | 6 |
| 1010 | $2^{704}$ | 320 | 5 |
| 1011 | $2^{768}$ | 256 | 4 |
| 1100 | $2^{832}$ | 192 | 3 |
| 1101 | $2^{896}$ | 128 | 2 |
| 1110 | $2^{960}$ | 64 | 1 |
| 1111 | $2^{1024}$ | 0 | 0 |

EXPLANATION:
[1] THIS COLUMN SHOWS THE 4-BIT SELECTED CCC SIZE FIELD.
[2] THE MODULUS MUST BE SMALLER THAN THE VALUE IN THIS COLUMN.
[3] THESE TWO COLUMNS INDICATE THE NUMBER OF LEFTMOST BITS, OR NUMBER OF LEFTMOST DOUBLEWORDS, WHICH MUST BE ZERO IN THE MODULUS FIELD.

FIG. 17

| BIT(S) | ABBR | NAME |
|---|---|---|
| 0 | P | BASIC PKSC ENABLE |
| 1 | I | PKSC INITIALIZATION ENABLE |
| 2 | X | PKSC XEM (EXTR. & ENC. MASTER KEY) ENABLE |
| 3 | L | PKSC LKP (LOAD KEY PART) ENABLE |
| 4 | | * |
| 5 | | CRYPTO-MODULE-TEST MODE |
| 6 | Y | PKSC TSN CONTROL |
| 7 | Z | PKSC SIGNATURE CONTROL |
| 8 | | ICRF SMR-nz (SET MKVN REG NONZERO) ENABLE |
| 9 | B | BASIC-ICRF ENABLE |
| 10 | C | ICRF CDMF ENABLE |
| 11 | D | ICRF DEA-PRIVACY ENABLE |
| 12 | | * |
| 13 | | * |
| 14 | | ICRF LOWER-KEY-AUTHORITY ENABLE |
| 15 | | ICRF DATA-COMPATIBILITY KEY ENABLE |
| 16 | | ICRF RESET-DOMAIN ENABLE |
| 17 | | ICRF GENERATE-ZERO-DATA-KEY ENABLE |
| 18 | | ICRF TEST-PATTERN ENABLE |
| 19 | | ICRF REGULAR-HASH-PATTERN ENABLE |
| 20 | | ICRF SPECIAL-REGISTER-HP ENABLE |
| 21 | | ICRF KEY-PARITY-TEST-AND-ADJUST ENABLE |
| 22 | | ICRF EXTENDED-KEY-MODIFICATION ENABLE |
| 23 | | ICRF MICRO-CODE-ASSIST ENABLE |
| 24 | | ICRF DIRECT-MK-ENTRY ENABLE |
| 25 | | ICRF DIRECT-AMK-ENTRY ENABLE |
| 26 | | ICRF SMK-USE ENABLE |
| 27 | | ICRF RMK-USE ENABLE |
| 28 | | ICRF RTMK ENABLE |
| 29 | | ICRF CSD DEA ENABLE |
| 30 | | * |
| 31 | | * |
| 32 | | BASIC KEK SIZE |
| 33 | | BASIC MK SIZE |
| 34 | | RECEIVER KEK SIZE |
| 35 | | RMK SIZE a (K1=K3) |
| 36 | | RMK SIZE b (K1=K2) |
| 37 | | * |
| 38-39 | | * |
| 40 | | PKSC XES (EXTRACT AND ENCRYPT SMK) ENABLE |
| 41 | | PKSC XER (EXTRACT AND ENCRYPT RMK) ENABLE |
| 42 | | PKSC LCS (LOAD AND COMBINE SMK) ENABLE |
| 43 | | PKSC LCR (LOAD AND COMBINE RMK) ENABLE |
| 44 | | PKSC RTS (REENCIPHER TO SMK) ENABLE |
| 45 | | PKSC RTR (REENCIPHER TO RMK) ENABLE |
| 46 | | PKSC RFS (REENCIPHER TO SMK) ENABLE |
| 47 | | PKSC RFR (REENCIPHER TO RMK) ENABLE |
| 48-63 | IAF | INITIALIZATION AUTHORITY FLAGS |
| NOTES: * RESERVED, NOT YET ASSIGNED. | | |

FIG.18A

| BIT(S) | ABBR | NAME |
|---|---|---|
| 64 | | PKA CRDS (CREATE DSS OBJECT) ENABLE |
| 65 | | * |
| 66 | | PKA BASIC DSS SIGNATURE ENABLE |
| 67 | | * |
| 68 | | PKA IEDS (IMPORT ENCRYPTED DSS KEY) ENABLE |
| 69 | | * |
| 70 | | PKA BASIC RSA SIGNATURE ENABLE |
| 71 | | PKA BASIC RSA RECEIVER ENABLE |
| 72 | | PKA IERS (IMPORT ENC RSA SIG KEY) ENABLE |
| 73 | | PKA IERR (IMPORT ENC RSA REC KEY) ENABLE |
| 74 | | PKA CRHS (CREATE DH SIG OBJECT) ENABLE |
| 75 | | PKA CRHR (CREATE DH REC OBJECT) ENABLE |
| 76 | | PKA BASIC DH SIGNATURE ENABLE |
| 77 | | PKA BASIC DH RECEIVER ENABLE |
| 78 | | PKA IEHS (IMPORT ENC DH SIG KEY) ENABLE |
| 79 | | PKA IEHR (IMPORT ENC DH REC KEY) ENABLE |
| 80–91 | | * |
| 92–95 | TD | PKSC DH SIZE FOR DEA KEY PROTECTION |
| 96–99 | TS | PKSC DH SIZE FOR SMK AND SOPK PROTECTION |
| 100–103 | TR | PKSC DH SIZE FOR RMK AND ROPK PROTECTION |
| 104–107 | DS | PKA SIZE FOR DSS SIGNATURE |
| 108–111 | | * |
| 112–115 | RS | PKA SIZE FOR RSA SIGNATURE |
| 116–119 | RR | PKA SIZE FOR RSA RECEIVE |
| 120–123 | HS | PKA SIZE FOR DH SIGNATURE |
| 124–127 | HR | PKA SIZE FOR DH RECEIVE |
| NOTES: * RESERVED, NOT YET ASSIGNED. | | |

| | FIG.19A(1) | FIG.19A(2) |
|---|---|---|

| CCC BIT | TYPE | FC | ABBR | FUNCTION CONTROLLED BY CCC BIT | | RSP |
|---|---|---|---|---|---|---|
| | | | | NAME | | |
| 0 | PKSC | 01 | QAR | QUERY AUTHORIZATION REGISTER | | S.cc |
| 0 | PKSC | 02 | QCB | QUERY PKSC CONTROL BLOCK | | S.cc |
| 0 | PKSC | 03 | QPC | QUERY PENDING-COMMAND REGISTER | | S.cc |
| 0 | PKSC | 04 | QHM | QUERY DH MODULUS | | S.cc |
| 0 | PKSC | 05 | QHG | QUERY DH GENERATOR | | S.cc |
| 0 | PKSC | 06 | QHF | QUERY DH FIRST KEY PART | | S.cc |
| 0 | PKSC | 07 | QBT | QUERY BASIC TRANSPORT | | S.cc |
| 0 | PKSC | 08 | QDI | QUERY DOMAIN INFORMATION | | S.cc |
| 0 | PKSC | 09 | QBT | QUERY PKA TRANSPORT | | S.cc |
| 0 | PKSC | 32 | LHM | LOAD DH MODULUS | | S.cc |
| 0 | PKSC | 33 | LHG | LOAD G AND GENERATE DH FIRST PART | | S.cc |
| 0 | PKSC | 34 | CHK | COMBINE DH KEY PARTS | | S.cc |
| 0 | PKSC | 71 | LCB | LOAD PKSC CONTROL BLOCK | | S.cc |
| 0 | PKSC | 72 | ZD | ZEROIZE DOMAIN | | S.cc |
| 0 | PKSC | 73 | LEC | LOAD ENVIRONMENT-CONTROL MASK | | S.cc |
| 1 | PKSC | 21 | LIM | LOAD INITIALIZATION PUBLIC MODULUS | | S.cc |
| 1 | PKSC | 61 | LCC | LOAD CRYPTO CONFIGURATION CONTROL | | S.cc |
| 2 | PKSC | 74 | XEM | EXTRACT AND ENCRYPT MASTER KEY | | S.cc |
| 3 | PKSC | 75 | LKP | LOAD KEY PART | | S.cc |
| 4 | | | | NOT ASSIGNED | | |
| 5 | PKSC | 75 | DGN | CRYPTO-MODULE-TEST MODE DIAGNOSE | | S.cc |
| 5 | PKSC | | | | | |
| 6 | PKSC | | | PKSC TSN CONTROL | | |
| 7 | PKSC | | | PKSC SIGNATURE CONTROL | | |
| 8 | PCCF | 05 | SMF-nz | SET MKVN REGISTER (NONZERO VALUE) | | l.cd |

FIG.19A(1)

| | | | | |
|---|---|---|---|---|
| 9 | PCMF | 00 | GMAC | GENERATE MAC | l.cd |
| 9 | PCMF | 01 | V32MAC | VERIFY 32-BIT MAC | l.cd |
| 9 | PCMF | 02 | V48MAC | VERIFY 48-BIT MAC | l.cd |
| 9 | PCMF | 03 | V64MAC | VERIFY 64-BIT MAC | l.cd |
| 9 | PCKMF | 01 | EMK | ENCIPHER UNDER MASTER KEY | l.cd |
| 9 | PCKMF | 02 | EIK | ENCIPHER UNDER IMPORTER KEY | l.cd |
| 9 | PCKMF | 03 | RFMK | REENCIPHER FROM MASTER KEY | l.cd |
| 9 | PCKMF | 06 | GCK | GENERATE COMPLEMENTARY KEYS EX/EX | l.cd |
| 9 | PCKMF | 07 | GCK | GENERATE COMPLEMENTARY KEYS IM/EX | l.cd |
| 9 | PCKMF | 09 | TK | TRANSLATE KEY | l.cd |
| 9 | PCKMF | 0A | RK | REENCIPHER KEY | l.cd |
| 9 | PCCF | 00 | EKR | ENABLE KEY-PART REGISTER | l.cd |
| 9 | PCCF | 02 | CNR | CLEAR NMK REGISTER | l.cd |
| 9 | PCCF | 03 | COR | CLEAR OMK REGISTER | l.cd |
| 9 | PCCF | 04 | SMK | SET MASTER KEY | l.cd |
| 9 | PCCF | 06 | LNP | LOAD NEW-MASTER-KEY PART | l.cd |
| 9 | PCCF | 07 | CFNP | COMBINE FINAL NMK PARTS | l.cd |
| 9 | PCCF | 08 | CINP | COMBINE INTERMEDIATE NMK PARTS | l.cd |
| 9 | PCCF | 09 | GMKVP | GENERATE VP FOR MK REGISTER | l.cd |
| 9 | PCCF | 0A | GNMKVP | GENERATE VP FOR NMK REGISTER | l.cd |
| 9 | PCCF | 0B | GOMKVP | GENERATE VP FOR OMK REGISTER | l.cd |
| 9 | PCCF | 0C | GNMKAP | GENERATE AP FOR NMK REGISTER | l.cd |
| 9 | PCCF | 0D | SCS | SENSE CRYPTO STATUS | l.cd |
| 9 | PCCF | 0E | RTNMK | REENCIPHER TO NEW MASTER KEY | l.cd |
| 9 | PCCF | 0F | RFOMK | REENCIPHER FROM OLD MASTER KEY | l.cd |

RESPONSES:
l.cd  ICRF RESPONSE CODE 'OD', CCC DISABLED.
S.cc  PKSC ABNORMAL REPLY '51', CONFIGURED COMMAND.

FIG.19A(2)

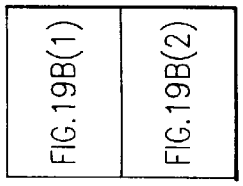

FIG.19B

| CCC BIT | TYPE | FC | FUNCTION CONTROLLED BY CCC BIT | | RSP |
|---|---|---|---|---|---|
| | | | ABBR | NAME | |
| 9 | PCCF | 10 | IKP | IMPORT KEY PART | l.cd |
| 9 | PCCF | 11 | CIKP | COMBINE INTERMEDIATE KEY PART | l.cd |
| 9 | PCCF | 12 | CFKPU | COMBINE FINAL KEY PARTS UNCHANGED | l.cd |
| 9 | PCCF | 13 | CFKPA | COMB. FINAL KEY PARTS & ADJ. PARITY | l.cd |
| 9 | PCPF | 00 | VVP | VERIFY VISA PIN | l.cd |
| 9 | PCPF | 01 | VINP | VERIFY INTERBANK PIN | l.cd |
| 9 | PCPF | 02 | VIGP | VERIFY IBM GBP PIN | l.cd |
| 9 | PCPF | 03 | VIP | VERIFY IBM 3624 PIN | l.cd |
| 9 | PCPF | 04 | GPVV | GENERATE VISA PVV | l.cd |
| 9 | PCPF | 05 | GINP | GENERATE INTERBANK PIN | l.cd |
| 9 | PCPF | 06 | GIGP | GENERATE IBM GBP PIN | l.cd |
| 9 | PCPF | 07 | GIP | GENERATE IBM 3624 PIN | l.cd |
| 9 | PCPF | 08 | GIPO | GENERATE IBM PIN OFFSET | l.cd |
| 9 | PCPF | 09 | RPB | REENCIPHER PIN BLOCK | l.cd |
| 9 | PCPF | 0A | TPB | TRANSLATE PIN BLOCK | l.cd |
| 9 | PCPF | 0B | GPVVE | GENERATE VISA PVV FROM EPB | l.cd |
| 10 | CMD | 02 | CDME | CDM ENCIPHER MULTIPLE DATA | l.cd |
| 10 | CMD | 03 | CDMD | CDM DECIPHER MULTIPLE DATA | l.cd |
| 10 | PCKMF | 0C | TCDMK | TRANSFORM CDM KEY | l.cd |
| 11 | CMD | 00 | EMD | ENCIPHER MULTIPLE DATA | l.cd |
| 11 | CMD | 01 | DMD | DECIPHER MULTIPLE DATA | l.cd |
| 11 | PCTF | 00 | RD | REENCIPHER DATA | l.cd |
| 12 | | | | NOT ASSIGNED | |
| 13 | | | | NOT ASSIGNED | |
| 14 | PCKMF | 11 | LKA | LOWER KEY AUTHORITY | l.cd |

FIG.19B(1)

| | | | | |
|---|---|---|---|---|
| 15 | PCKMF | 05 | GDCK | GENERATE DAT-COMP KEYS IM/IM | l.cd |
| 15 | PCKMF | 12 | CTMAK | CONVERT DAT-COMP KEY TO MAC KEY | l.cd |
| 15 | PCKMF | 13 | CTDCK | CONVERT DATA KEY TO DAT-COMP KEY | l.cd |
| 15 | PCKMF | 14 | CTDK | CONVERT DAT-COMP KEY TO DATA KEY | l.cd |
| 15 | PCKMF | 15 | CTDTK | CONVERT DAT-COMP KEY TO DAT-TRNS KEY | l.cd |
| 16 | PCCF | 1D | RDM | RESET DOMAIN | l.cd |
| 17 | PCKMF | 0D | GZDK | GENERATE ZERO DATA KEY | l.cd |
| 18 | PCKMF | 0E | GTP | GENERATE TEST PATTERN | l.cd |
| 18 | PCKMF | 10 | VTP | VERIFY TEST PATTERN | l.cd |
| 19 | PCKMF | 0F | GHP | GENERATE HASH PATTERN | l.cd |
| 20 | PCCF | 15 | GMKHP | GENERATE HP FOR MK REGISTER | l.cd |
| 20 | PCCF | 16 | GNMKHP | GENERATE HP FOR NMK REGISTER | l.cd |
| 20 | PCCF | 17 | GOMKHP | GENERATE HP FOR OMK REGISTER | l.cd |
| 20 | PCCF | 18 | GKPHP | GENERATE HP FOR KP REGISTER | l.cd |
| 21 | PCKMF | 16 | TKP | TEST KEY PARITY | l.cd |
| 21 | PCKMF | 17 | AKP | ADJUST KEY PARITY | l.cd |
| 22 | PCKMF | 0B | CUCV | CONVERT DAT-COMP KEYS USING ENC CV | l.cd |
| 23 | | | | MICRO-CODE ASSISTS (NONE ASSIGNED) | |
| 24 | PCCF | 19 | GMKAP | GENERATE AP FOR MK REGISTER | l.cd |
| 24 | PCCF | 20 | RMR | RESET MK REGISTER | l.cd |
| 24 | PCCF | 24 | LMCP | LOAD MK CLEAR PART | l.cd |
| 24 | PCCF | 28 | CMCP | COMBINE MK CLEAR PART | l.cd |

RESPONSES:
l.cd ICRF RESPONSE CODE 'OD', CCC DISABLED.

FIG.19B(2)

| CCC BIT | FUNCTION CONTROLLED BY CCC BIT ||||  RSP |
|---|---|---|---|---|---|
| | TYPE | FC | ABBR | NAME | |
| 25 | PCCF | 1C | CINCP | COMBINE INTERMEDIATE NMK CLEAR PART | I.cd |
| 25 | PCCF | 25 | LNCP | LOAD NMK CLEAR PART | I.cd |
| 25 | PCCF | 29 | CFNCP | COMBINE FINAL NMK CLEAR PART | I.cd |
| 26 | PCCF | 1A | GSMKHP | GENERATE HP FOR SMK REGISTER | I.cd |
| 26 | PCCF | 22 | RSR | RESET SMK REGISTER | I.cd |
| 26 | PCCF | 26 | LSCP | LOAD SMK CLEAR PART | I.cd |
| 26 | PCCF | 2A | CSCP | COMBINE SMK CLEAR PART | I.cd |
| 27 | PCCF | 1B | GRMKHP | GENERATE HP FOR RMK REGISTER | I.cd |
| 27 | PCCF | 23 | RRR | RESET RMK REGISTER | I.cd |
| 27 | PCCF | 27 | LRCP | LOAD RMK CLEAR PART | I.cd |
| 27 | PCCF | 2B | CRCP | COMBINE RMK CLEAR PART | I.cd |
| 28 | PCKMF | 04 | RTMK | REENCIPHER TO MASTER KEY | I.cd |
| 29 | CSD | 00 | ESD | ENCIPHER SINGLE DATA | I.cd |
| 29 | CSD | 01 | DSD | DECIPHER SINGLE DATA | I.cd |
| 30 | | | | NOT ASSIGNED | |
| 31 | | | | NOT ASSIGNED | |
| 40 | PKSC | 76 | XES | EXTRACT AND ENCRYPT SMK | S.cc |
| 41 | PKSC | 76 | XER | EXTRACT AND ENCRYPT RMK | S.cc |
| 42 | PKSC | 77 | LCS | LOAD AND COMBINE SMK | S.cc |
| 43 | PKSC | 77 | LCR | LOAD AND COMBINE RMK | S.cc |
| 44 | PKSC | 78 | RTS | REENCIPHER TO SMK | S.cc |
| 45 | PKSC | 78 | RTR | REENCIPHER TO RMK | S.cc |
| 46 | PKSC | 79 | RFS | REENCIPHER FROM SMK | S.cc |
| 47 | PKSC | 79 | RFR | REENCIPHER FROM RMK | S.cc |
| 64 | PKA | 10 | CRDS | CREATE DSS OBJECT | A.cc |
| 65 | | | | NOT ASSIGNED | |
| 66 | PKA | 11 | ICDS | IMPORT CLEAR DSS KEY | A.cc |
| 66 | PKA | 13 | GDS | GENERATE DSS SIGNATURE | A.cc |
| 66 | PKA | 14 | XPDS | EXTRACT DSS PUBLIC KEY | A.cc |
| 67 | | | | NOT ASSIGNED | |
| 68 | PKA | 12 | IEDS | IMPORT ENCRYPTED DSS KEY | A.cc |
| 69 | | | | NOT ASSIGNED | |
| 70 | PKA | 21 | ICRS | IMPORT CLEAR RSA SIGNATURE KEY | A.cc |
| 70 | PKA | 23 | GRS | GENERATE RSA SIGNATURE | A.cc |
| 71 | PKA | 21 | ICRR | IMPORT CLEAR RSA RECEIVER KEY | A.cc |
| 71 | PKA | 23 | RURR | RECEIVE USING RSA RECEIVER KEY | A.cc |

RESPONSES:
  A.cc  PKA ABNORMAL REPLY '51', CONFIGURED COMMAND.
  I.cd  ICRF RESPONSE CODE '0D', CCC DISABLED.
  S.cc  PKSC ABNORMAL REPLY '51', CONFIGURED COMMAND.

FIG.19C

| CCC BIT | FUNCTION CONTROLLED BY CCC BIT | | | | RSP |
|---|---|---|---|---|---|
| | TYPE | FC | ABBR | NAME | |
| 72 | PKA | 22 | IERS | IMPORT ENCRYPTED RSA SIGNATURE KEY | A.cc |
| 73 | PKA | 22 | IERR | IMPORT ENCRYPTED RSA RECEIVER KEY | A.cc |
| 74 | PKA | 30 | CRHS | CREATE DH SIGNATURE OBJECT | A.cc |
| 75 | PKA | 30 | CRHR | CREATE DH RECEIVER OBJECT | A.cc |
| 76 | PKA | 31 | ICHS | IMPORT CLEAR DH SIGNATURE KEY | A.cc |
| 76 | PKA | 33 | GHS | GENERATE USING DH SIGNATURE KEY | A.cc |
| 77 | PKA | 31 | ICHR | IMPORT CLEAR DH RECEIVER KEY | A.cc |
| 77 | PKA | 33 | RUHR | RECEIVE USING DH RECEIVER KEY | A.cc |
| 78 | PKA | 32 | IEHS | IMPORT ENCRYPTED DH SIGNATURE KEY | A.cc |
| 79 | PKA | 32 | IEHR | IMPORT ENCRYPTED DH RECEIVER KEY | A.cc |
| RESPONSES: A.cc PKA ABNORMAL REPLY '51', CONFIGURED COMMAND. | | | | | |

FIG.19D

| CCC KEK SIZE BIT(S) | TYPE | FC | ABBR | FUNCTION NAME | RSP |
|---|---|---|---|---|---|
| 32 | PCKMF | 03 | RFMK | REENCIPHER FROM MASTER KEY | l.ck |
| 32 | PCKMF | 04 | RTMK | REENCIPHER TO MASTER KEY | l.ck |
| 32 | PCKMF | 0A | RK | REENCIPHER KEY | l.ck |
| 33 | PCCF | 24 | LMCP | LOAD MK CLEAR PART | l.ck |
| 33 | PCCF | 25 | LNCP | LOAD NMK CLEAR PART | l.ck |
| 33 | PCCF | 28 | CMCP | COMBINE MK CLEAR PART | l.ck |
| 33 | PCCF | 29 | CFNCP | COMBINE FINAL NMK CLEAR PART | l.ck |
| 34 | PKA | 22 | IERR | IMPORT ENCRYPTED RSA RECEIVER KEY | A.ck |
| 34 | PKA | 32 | IEHR | IMPORT ENCRYPTED DH RECEIVER KEY | A.ck |
| 35-36 | PCCF | 27 | LRCP | LOAD RMK CLEAR PART | l.ck |
| 35-36 | PCCF | 2B | CRCP | COMBINE RMK CLEAR PART | l.ck |
| 37-39 | | | | NOT ASSIGNED | |
| RESPONSES: A.ck PKA ABNORMAL REPLY '78', CONFIGURED KEY SIZE. l.ck ICRF RESPONSE CODE '0C', CONFIGURED KEY SIZE. | | | | | |

FIG.20

| CCC MOD SIZE FIELD | TYPE | FC | ABBR | FUNCTION NAME | RSP |
|---|---|---|---|---|---|
| 80-91 | | | | NOT ASSIGNED | |
| 92-95 | PKSC | 74 | XEM | EXTRACT AND ENCRYPT MASTER KEY | S.cm |
| 92-95 | PKSC | 75 | LKP | LOAD KEY PART | S.cm |
| 96-99 | PKSC | 76 | XES | EXTRACT AND ENCRYPT SMK | S.cm |
| 96-99 | PKSC | 77 | LCS | LOAD AND COMBINE SMK | S.cm |
| 96-99 | PKSC | 78 | RTS | REENCIPHER TO SMK | S.cm |
| 96-99 | PKSC | 79 | RFS | REENCIPHER FROM SMK | S.cm |
| 100-103 | PKSC | 76 | XER | EXTRACT AND ENCRYPT RMK | S.cm |
| 100-103 | PKSC | 77 | LCR | LOAD AND COMBINE RMK | S.cm |
| 100-103 | PKSC | 78 | RTR | REENCIPHER TO RMK | S.cm |
| 100-103 | PKSC | 79 | RFR | REENCIPHER FROM RMK | S.cm |
| 104-107 | PKA | 13 | GDS | GENERATE DSS SIGNATURE | S.cm |
| 104-107 | PKA | 14 | XPDS | EXTRACT DSS PUBLIC KEY | S.cm |
| 108-111 | | | | NOT ASSIGNED | |
| 112-115 | PKA | 23 | GRS | GENERATE RSA SIGNATURE | A.cm |
| 116-119 | PKA | 23 | RURR | RECEIVE USING RSA RECEIVER KEY | A.cm |
| 120-123 | PKA | 33 | GHS | GENERATE USING DH SIGNATURE KEY | A.cm |
| 124-127 | PKA | 33 | RUHR | RECEIVE USING DH RECEIVER KEY | A.cm |
| RESPONSES: A.cm PKA ABNORMAL REPLY '83', CONFIGURED MODULUS. S.cm PKSC ABNORMAL REPLY '83', CONFIGURED MODULUS. | | | | | |

| INITIALIZATION AUTHORITY | PUBLIC MODULUS | SECRET EXPONENT | LOADED IN AR |
|---|---|---|---|
| A | IPMA | IASEA | 14 |
| B | IPMB | IASEB | 15 |

FIG.23

| UNIT | CHIP INFORMATION | | | | ICM GROUPS | | LIM GRP | CONFIGURATION GROUPS | | | | | |
|---|---|---|---|---|---|---|---|---|---|---|---|---|---|
| | CMID | CMSE | CMPM | hp(CMPM) | IGT | IGO | LG | CG.c1 | CG.c2 | CG.d1 | CG.d2 | CG.u1 | CG.u2 |
| 1 | CMID1 | CMSE1 | CMPM1 | hp(CMPM1) | IGT | IGO | LG | CG.c1 | CG.c2 | CG.d1 | CG.d2 | CG.u1 | CG.u2 |
| 2 | CMID2 | CMSE2 | CMPM2 | hp(CMPM2) | IGT | IGO | LG | CG.c1 | CG.c2 | CG.d1 | CG.d2 | CG.u1 | CG.u2 |
| n | CMIDn | CMSEn | CMPMn | hp(CMPMn) | IGT | IGO | LG | CG.c1 | CG.c2 | CG.d1 | CG.d2 | CG.u1 | CG.u2 |

FIG.24

| Ix | ccc.Ix (IN HEX) | COMMENTS |
|---|---|---|
| IT | F4E3 FF00 F8FF 0000 ABFF 0000 0020 0000 | ICM FOR CRYPTO-TEST CONFIGURATION |
| I0 | C400 0000 0000 0000 0000 0000 0000 0000 | ICM FOR CMI AND ZEROIZE |

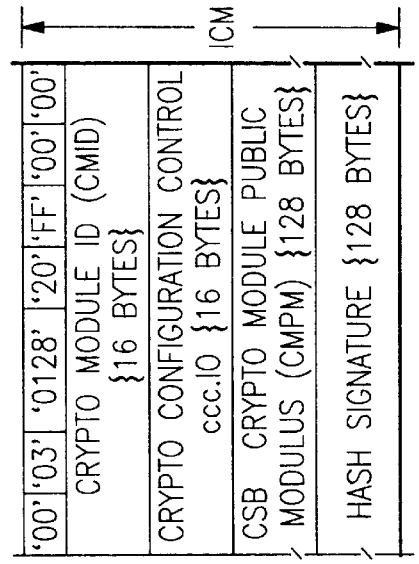

FIG.25

| yy | EXPORT CONTROL LEVEL | MASTER-KEY ENTRY STYLE | ccc.yy (IN HEX) | ECM.yy (IN HEX) |
|---|---|---|---|---|
| c1 | CDMF | NON TKE | 91E3 FEF8 0030 0000 ABFF 0007 F7F0 F7F7 | D3FE FCF0 |
| c2 | CDMF | TKE | B3E3 FEF8 00F0 0000 ABFF 0007 F7F0 F7F7 | D3FE FCF0 |
| d1 | FULL-DEA | NON TKE | 91F3 FEFC 0030 0000 ABFF 0007 F7F0 F7F7 | F3FE FCF0 |
| d2 | FULL-DEA | TKE | B3F3 FEFC 00F0 0000 ABFF 0007 F7F0 F7F7 | F3FE FCF0 |
| u1 | USA-AND-CAN | NON TKE | 91F3 FEFC 0030 0000 ABFF 000F FFF0 FFFF | F3FE FCF0 |
| u2 | USA-AND-CAN | TKE | B3F3 FEFC 00F0 0000 ABFF 000F FFF0 FFFF | F3FE FCF0 |

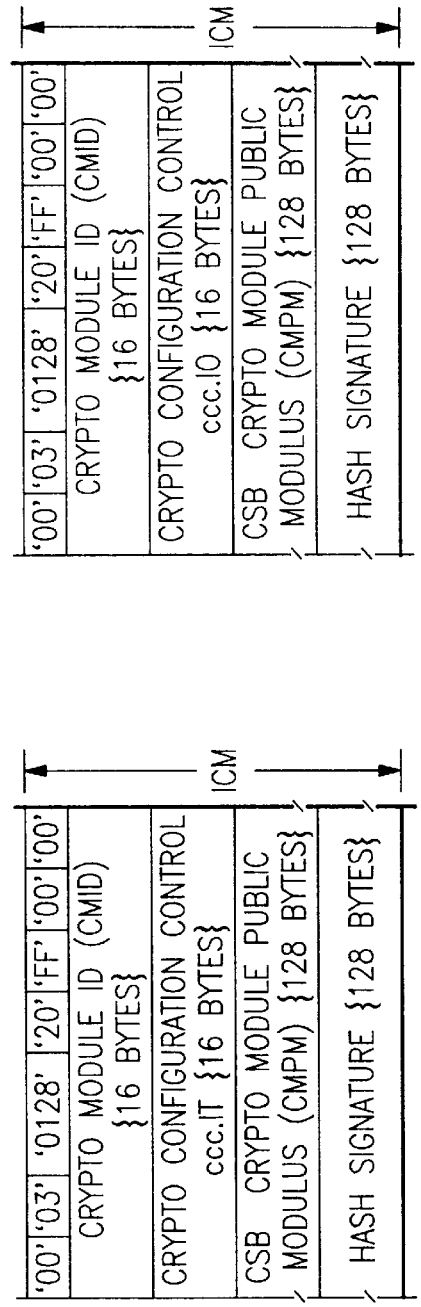

FIG.26

'00'|'03'|'0128'|'20'|'FF'|'00'|'00'
CRYPTO MODULE ID (CMID) {16 BYTES}
CRYPTO CONFIGURATION CONTROL ccc.IT {16 BYTES}
CSB CRYPTO MODULE PUBLIC MODULUS (CMPM) {128 BYTES}
HASH SIGNATURE {128 BYTES}

FIG.27

'00'|'03'|'0128'|'20'|'FF'|'00'|'00'
CRYPTO MODULE ID (CMID) {16 BYTES}
CRYPTO CONFIGURATION CONTROL ccc.IO {16 BYTES}
CSB CRYPTO MODULE PUBLIC MODULUS (CMPM) {128 BYTES}
HASH SIGNATURE {128 BYTES}

FIG.35

| BIT | 0 | 8 | 16 | 32 | 40 | 48 | 56 | 63 |
|---|---|---|---|---|---|---|---|---|
| BYTE 0 | '00' | '03' | '00B0' | '73' | sx | dx | '00' |
| 8 | CRYPTO MODULE ID (CMID) {16 BYTES} ||||||||
| 24 | TRANSACTION SN (TSN) {16 BYTES} ||||||||
| 40 | CSB.F1 ECM {4} | CSB.F2 PADDING {4} ||||||
| 48 | HASH SIGNATURE {128 BYTES} ||||||||

| BIT | 0 | 8 | 16 | 32 | 40 | 48 | 56 | 63 |
|---|---|---|---|---|---|---|---|---|
| BYTE 0 | '00' | '03' | '0128' | '70' | sx | ax | '00' |
| 8 | CRYPTO MODULE ID (CMID) {16 BYTES} ||||||||
| 24 | TRANSACTION SN (TSN) {16 BYTES} ||||||||
| 40 | CSB AUTHORIZATION PUBLIC MODULUS (APM) {128 BYTES} ||||||||
| 168 | HASH SIGNATURE {128 BYTES} ||||||||

| BIT | 0 | 8 | 16 | 32 | 40 | 48 | 56 | 63 |
|---|---|---|---|---|---|---|---|---|
| BYTE 0 | '00' | '03' | '0100' | '71' | sx | '00' | '00' |
| 8 | CRYPTO MODULE ID (CMID) {16 BYTES} ||||||||
| 24 | TRANSACTION SN (TSN) {16 BYTES} ||||||||
| 40 | CSB.F1 PKSC CONTROL BLOCK (PCB) {88 BYTES} ||||||||
| 128 | HASH SIGNATURE {128 BYTES} ||||||||

256

METHOD AND APPARATUS FOR CONTROLLING THE CONFIGURATION OF A CRYPTOGRAPHIC PROCESSOR

CROSS-REFERENCE TO RELATED APPLICATIONS

This application is related to the following commonly owned, concurrently filed applications, incorporated herein by reference:

R. M. Smith, Sr. et al., "Method and Apparatus for Providing Public Key Security Control for a Cryptographic Processor", Ser. No. 08/884,724 (docket PO997091);

R. M. Smith, Sr. et al., "Method and Apparatus for the Secure Transfer of Objects Between Cryptographic Processors", Ser. No. 08/885,612 (docket PO997092);

BACKGROUND OF THE INVENTION

1. Field of the Invention

This invention relates to a method and apparatus for initializing the configuration of a crypto module and, more particularly, to a method and apparatus for initializing the configuration of the cryptographic coprocessor of a general-purpose computer.

2. Description of the Related Art

Cryptographic functions of a general-purpose computer such as data encryption, digital signature processing and key management have often been performed by a cryptographic coprocessor, both for performance reasons and because of the special security problems posed by the cryptographic environment. One example of a cryptographic coprocessor in an IBM S/390 environment is the Integrated Cryptographic Facility (ICRF). ICRF was used with processors employing bipolar technology. With the migration to CMOS processor technology, as exemplified by the S/390 Parallel Enterprise Server, new technological challenges have arisen in the design of a cryptographic coprocessor that is optimized for a CMOS setting.

It is desirable to install a cryptographic processor as part of a basic machine and ship these machines worldwide without export restrictions. It is also desirable to keep the number of hardware part numbers and versions to a minimum. To do this requires that the cryptographic functions on the cryptographic processor be disabled until some external form of enabling is supplied. This enabling function must be secure, must be unique for each cryptographic processor, and must provide granularity of enabling. That is:

1. It must be computationally infeasible for an agent other than the manufacturer of the cryptographic processor to produce the enabling information.
2. The enabling information for one cryptographic processor must not be useable to enable another cryptographic processor.
3. It must be possible to enable different subsets of the functions on the cryptographic processor.

In addition, examination of the export requirements, customer requirements, and marketing segments shows that there are a great many different crypto configurations that may need to be shipped. This includes, but is not limited to, machines with and without the commercial data masking facility (CDMF); with and without full DES; authentication-only systems; European versus USA and Canada; 512-bit versus 1024-bit RSA; and 512-bit versus 1024-bit Diffie-Hellman (DH) key exchange. These may need to be separately controlled for protection of signature objects and receive objects. There may also be certain low-security functions, such as clear master key entry, which some customers may need and others may require be disabled. There may be additional bits in the crypto configuration control, such as test mode or enablement of various checking schemes, which may need to be set. It becomes clear that it is not practical to generate individual setup sequences for such a large number of different crypto configurations as part of the manufacturing process.

In addition to the problem of many possible configurations, there may also be the problem of resale of a cryptographic processor. Consider that a customer may desire to sell his system containing a cryptographic processor to another owner. What happens if it turns out that under the export controls, the new owner is not entitled to all the functions enabled for the first customer? If the second customer has access to the information used to load the configuration for the first customer, this can be replayed to enable the same configuration.

Finally, a cryptographic processor must be initialized with customer-supplied information, including information to identify public keys of authorities, which of these are authorized to add or remove authorities, which are authorized to change signature requirements, enter key parts, enable or disable crypto, or set the special security mode. The authorized customer program must be permitted to load this information, but at the same time, programs not authorized must be prevented from loading incorrect information into the crypto module.

SUMMARY OF THE INVENTION

In accordance with the present invention, a crypto configuration control (CCC) register is defined in the cryptographic processor. The CCC contains individual bits for each function which may need to be controlled. Fields are also assigned in the CCC to control the maximum size of those keys which are subject to export restrictions. A special command, Initialize Crypto Module (ICM), is defined which resets and initializes the cryptographic processor and loads the CCC register. The ICM command has a self-signature, that is, it has been signed by the secret key of the cryptographic processor itself. The cryptographic processor accepts this command only if the signature can be verified using the public key of the cryptographic processor.

When the secret key for each cryptographic processor is created, a self-signature is generated for several ICM commands, one for each allowable configuration. The enabling function, in the form of the Initialize Crypto Module (ICM) command, can then be shipped separately from the hardware (as in an enablement diskette).

Previous proposals have included such things as encrypting the control information using a key known only to the manufacturer of the crypto processor, or encrypting the control information using the public or private key of the cryptographic processor. The present invention has the advantage that the control information is in the clear and can be read and inspected.

Some proposals have been shown to be subject to attack from a knowledgeable opponent. Since the present invention can use published digital signature standards, it can be assumed that it is not subject to such attacks.

A variation of the present invention uses an indirect method for loading the CCC. The self-signed information created when the chip is created does not load the final CCC bits, but loads information which may be used to securely control the loading of the CCC bits. Two or more initialization authorities affiliated with the manufacturer of the crypto module are established. These are people whose job is to oversee and control the configurations assigned to each chip. A public-private key pair is generated for each of these initialization authorities. Two additional crypto module commands are defined: Load Initialization Public Modulus (LIM) and Load Crypto Configuration Control (LCC). At chip generation time, self-signatures are created for two Load Initialization Public Modulus (LIM) commands. These commands can then be used to load the public key for each of these authorities. Later, when the actual configuration requirements are known, cosignatures are generated for the Load Crypto Configuration Control (LCC) command. The LCC command loads the CCC only after signatures cosigned by each of these authorities have been successfully verified.

To solve the resale problem, a one-time authorization protocol which cannot be replayed is provided. This is accomplished by assigning a CCC bit to control TSN checking and a CCC bit to control signature checking. The use of CCC bits in this manner makes it possible to provide either static or dynamic configuration control, or both, without requiring any changes to the chip.

This is an enhancement of the basic crypto configuration control system outlined above. The enhancement permits much more flexibility in that the configuration value to be shipped does not have to be established at the time the chip is created. This invention also provides for both static and dynamic configuration.

In accordance with yet another aspect of the present invention, the cryptographic processor is powered up in a state which permits any program (authorized or not) to load customer-supplied control information. Thus, the first program to attempt to load information into the chip will be able to do so. The information loaded includes controls on these initialization functions, even to the point of setting them completely disabled. Thus, the first program can establish the requirements and limitations placed upon these functions. For example, if the first program disables the initialization functions, then subsequent programs will not be able to change this information.

There must be, of course, some mechanism to reset the module after it has been loaded. This would be required, for example, if the program has an error, the program was only a testing program, or if the chip is sold. This reset function, however, clears out all information from the chip and restores it to a completely initialized state.

In most situations, the first program to gain access to the chip will be the authorized program, and this program will load the correct information such that unauthorized programs cannot subsequently change this information. But what happens if an unauthorized program is the first to load the module? This problem is solved by means of query commands which provide information publicly available to all programs. The query information is signed by the secret key of the cryptographic processor, and thus can be verified for authenticity. Before a program uses the chip it may query the chip to determine the state of the chip. If the information does not correspond to that which should be in the chip, then the program may refuse to use the chip until it has been correctly initialized. Thus, an attacker may take over a chip, but legitimate programs will be warned not to use it.

Past products have provided initialization by means of special physical switches or protection against physical access. These techniques cannot be applied to a CMOS cryptographic processor because the chip itself is not large enough to attach physical keys, and the location of the chip in the machine does not lend itself to permitting special access for initialization. This invention permits the cryptographic processor to be initialized by the customer from the convenience of his own work station in his own office.

Past products have protected initialization information by making it inaccessible to anyone except for the initialization process. This leads to susceptibility to attack. This invention provides public access to all initialization information thus making every step of the initialization process publicly auditable.

BRIEF DESCRIPTION OF THE DRAWINGS

FIG. 5 shows the PKSC control block (PCB).

FIG. 6 shows the signature requirement array (SRA).

FIG. 7 shows a particular entry in the signature requirement array (SRA).

FIG. 16 shows the format of the crypto configuration control.

FIG. 17 shows the configured modulus computation.

FIG. 18 (A and B) shows the CCC bit and field assignment.

FIG. 19 (A,B, C, and D) shows the functions controlled by CCC enable bits.

FIG. 20 shows the functions controlled by the CCC KEK size (KSZ) fields.

FIG. 21 shows the functions controlled by the CCC modulus size fields.

FIG. 22 shows the initialization authorities.

FIG. 23 shows the general form of the crypto module data base.

FIG. 24 shows the values for ccc.IT and ccc.I0.

FIG. 25 shows the value for ccc.yy.

FIG. 26 shows the ICM group IGT.

FIG. 27 shows the ICM group IG0.

FIG. 34 shows the format of a Load Authorization Public Modulus (LAP) command.

FIG. 35 shows the format of a Load Environment Control Mask (LEC) command.

FIG. 36 shows the format of a Load PKSC Control Block (LCB) command 116.

DESCRIPTION OF THE PREFERRED EMBODIMENTS

Public Key Security Control (PKSC) Overview

Figure 1:
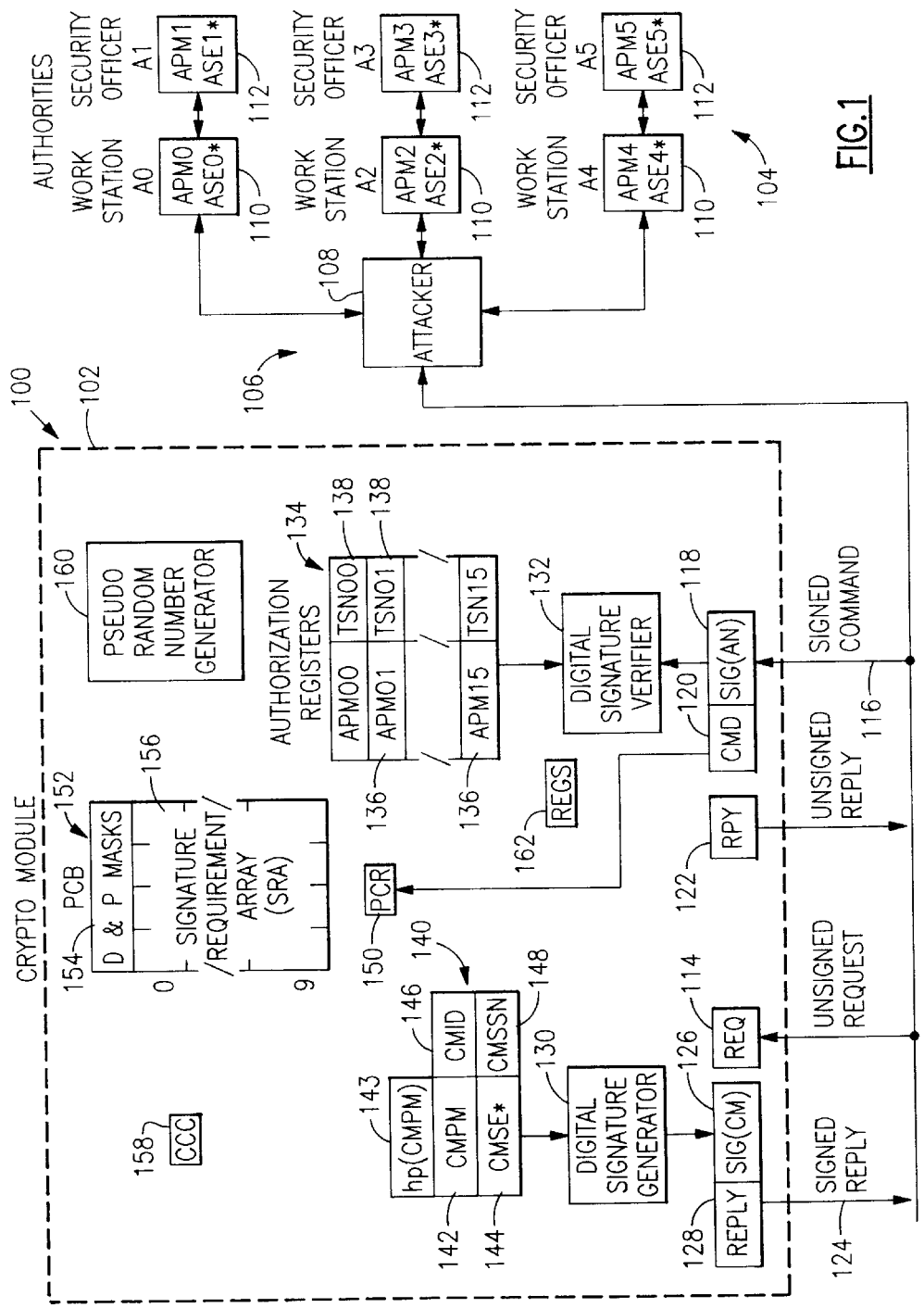
FIG. 1 is a schematic block diagram of an information handling system incorporating the present invention.

FIG. 1 is a schematic block diagram of an information handling system 100 incorporating the present invention. As shown in FIG. 1, in system 100 a crypto module 102 is coupled to one or more authorities 104 (A0–A5) via a network 106 to which an attacker 108 is presumed to have access. Crypto module 102 may be either a standalone unit or physically integrated into a central processor complex (CPC) (not separately shown) of a general-purpose digital computer. Authorities 104 may comprise either workstations 110 (A0, A2, A4) or security officers 112 (A1, A3, A5).

The internal elements of the crypto module 102, described in more detail below and in the related applications referred to above, will now be briefly described. The following table provides an explanation of various terms used in FIG. 1:

| | |
|---|---|
| * | Information is secret |
| APMn | Public Modulus for Authority n |
| ASEn* | Secret Exponent for Authority n |
| CCC | Crypto Configuration Control |
| CMID | Crypto Module ID |
| CMPM | Crypto Module Public Modulus |
| CMSE* | Crypto Module Secret Exponent |
| CMSSN | Crypto Module Signature Sequence Number |
| PCB | PKSC Control Block |
| PCR | Pending Command Register |

A particular authority n (An) 104 interacts with the crypto module 102 by way of either an unsigned request (Req) or query 114 or a signed command 116 having a digital signature 118 (Sig(An)) of the authority n appended to a signed portion 120 (Cmd). The crypto module 102 responds to a signed command 116 or an unsigned query 114 with a signed reply (Reply) 124 having a signature (Sig(CM)) 126 appended to a signed portion 128. When a request command cannot be performed because of error or other abnormal conditions, the crypto module 102 responds to the request command 116 or 114 with an unsigned reply (Rpy) 122.

Figure 2:
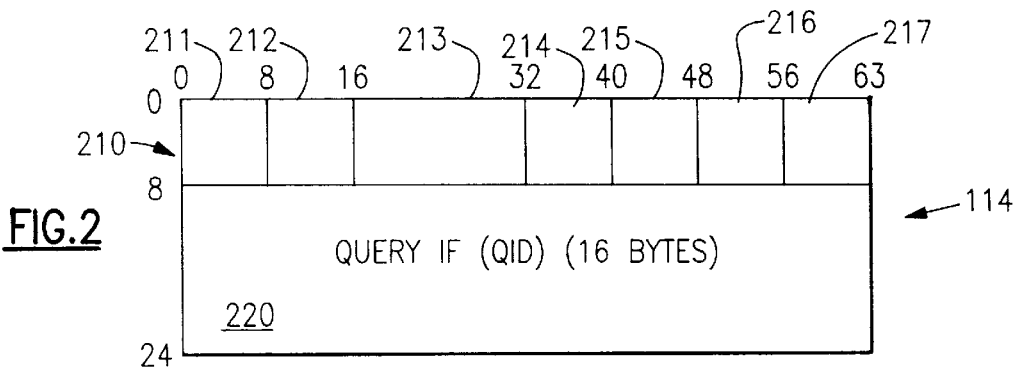
FIG. 2 shows the format of a typical query.

FIG. 2 shows the format of a typical query 114, which in the disclosed embodiment has a total length of 24 bytes (192 bits).

Query 114 contains an 8-byte (64-bit) header 210 made up of various fields 211–217, followed by a 16-byte (128-bit) query identifier (QID) 220 that is generated randomly by the originating authority 104.

Figure 3:
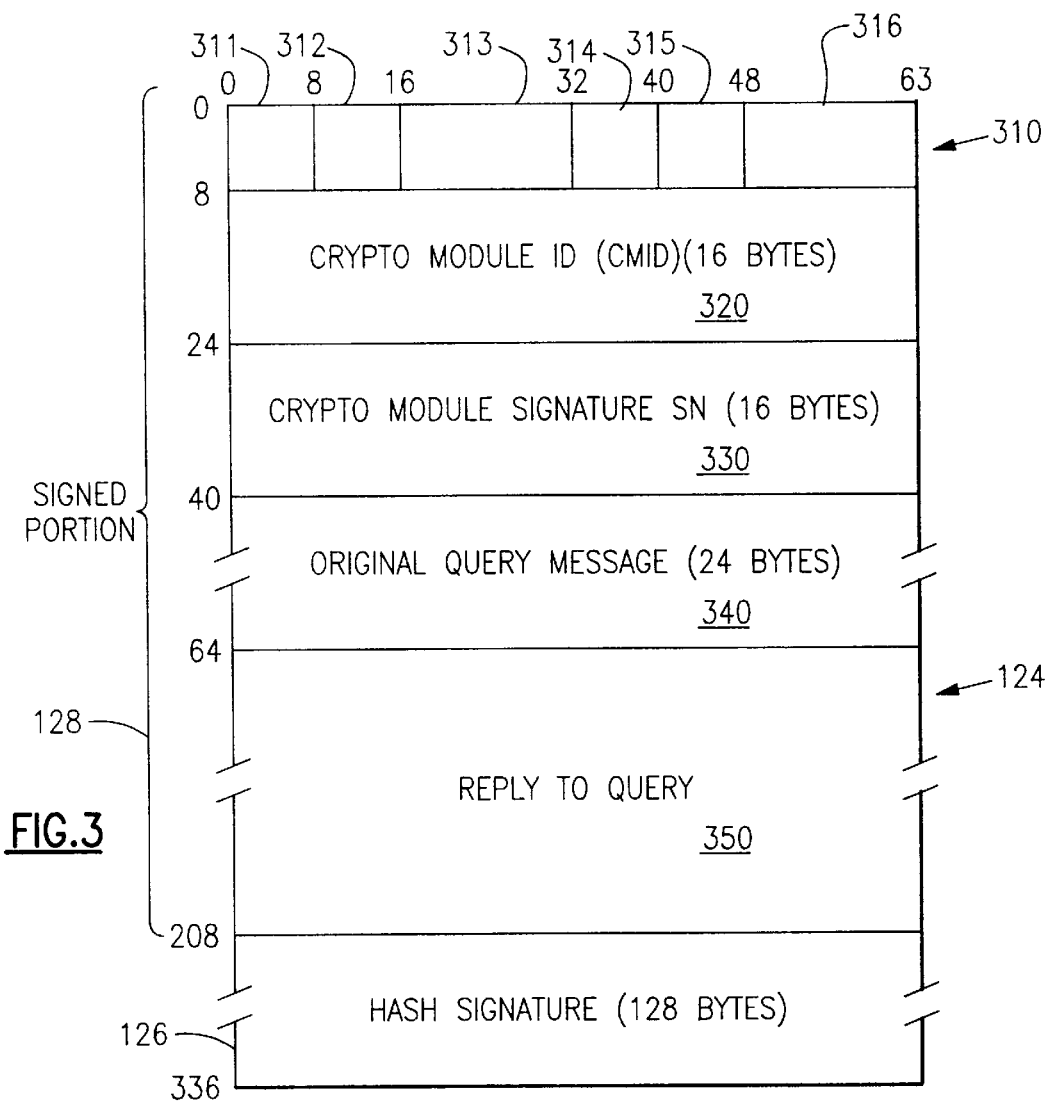
FIG. 3 shows the format of a typical reply to a query.

FIG. 3 shows the format of a typical reply 124 to a query 114, which in the disclosed embodiment has a total length of 42 bytes (336 bits) consisting of a 26-byte (208-bit) signed portion 128 and a 128-byte (1024-bit) digital signature 126. Signed portion 128 contains an 8-byte (64-bit) header 310 made up of various fields 311–316, followed by a 16-byte (128-bit) crypto identifier (CMID) 320, a 16-byte (128-bit) crypto module signature sequence number (SMSSN) 330, a 24-byte (192-bit) copy 340 of the original query message 114 and, finally, a 144-byte reply proper 350.

Figure 4:
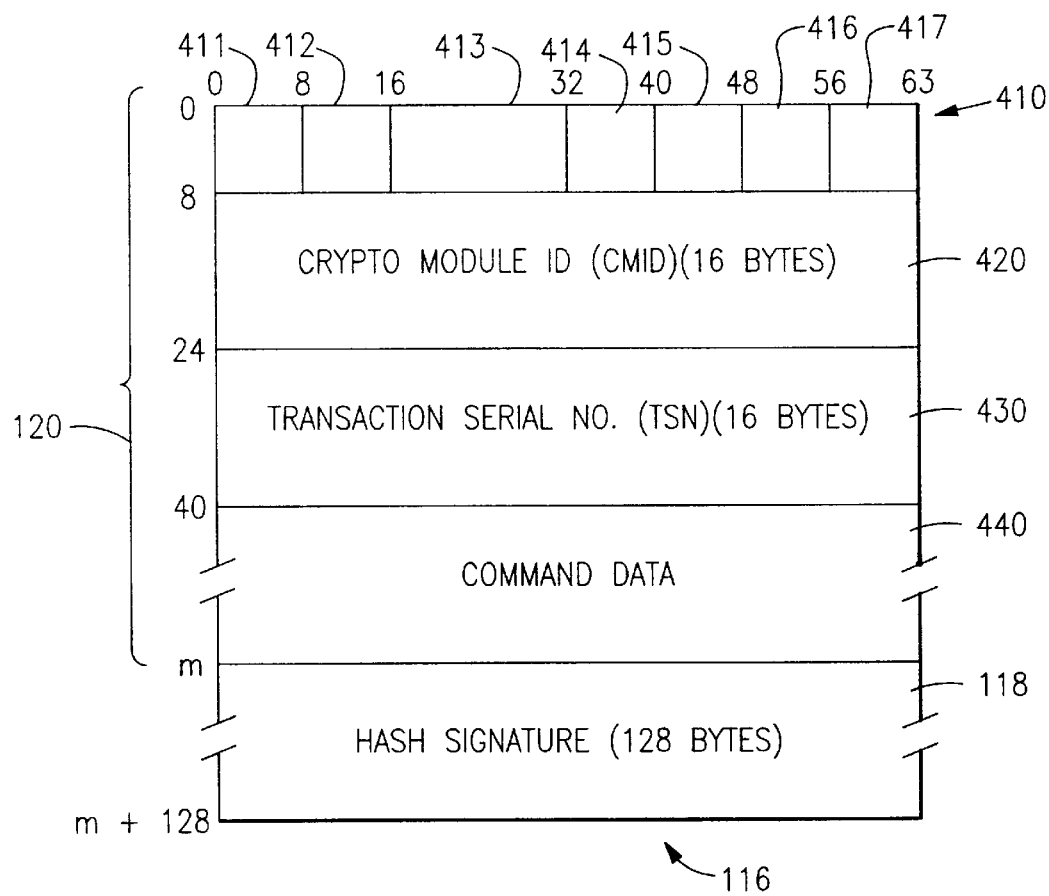
FIG. 4 shows the format of a typical signed command.

FIG. 4 shows the format of a typical command 116. Signed portion 120 contains an 8-byte (64-bit) header 410 made up of various fields 411–417, followed by a 16-byte (128-bit) crypto identifier (CMID) 420, a 16-byte (128-bit) transaction sequence number (TSN) 430 (in commands requiring a signature of the issuing authority 104), and a variable-length portion 440 containing command data, the nature of which varies with the command. Following the signed portion 120 is a 128-byte (1024-bit) hash signature 118. In the disclosed embodiment, header fields 411 and 412 contain the respective hexadecimal values '00' and '03' for all commands, while the content of fields 413–417 varies with the command.

A digital signature generator 130 is used to generate the digital signature 126 appended to a reply 128, while a digital signature verifier 132 is used to verify a signature 118 received from an authority 104.

A set of authorization registers 134 store authorization information, including a public modulus (APMn) 136 and a transaction sequence number (TSNn) 138, for each authority n for up to 16 different authorities 104 in the embodiment shown. The public modulus 136 is used by digital signature verifier 132 to verify a digital signature 118 received from an authority 104. The transaction sequence number 138 is used to compare with the sequence number 430 in the command 116 received from an authority 104, as described below.

Crypto module 102 also has a set of registers 140 for storing various crypto module information, including a crypto module public modulus (CMPM) 142, a crypto module secret exponent (CMSE) 144, a crypto module identifier (CMID) 146, and a crypto module signature sequence number (CMSSN) 148. CMPM 142 and CMSE 144 are used by digital signature generator 130 to generate the digital signatures 126 appended to replies 128 to queries 114 or commands 116. CMID 146 and CMSSN 148 are used for purposes to be described below. In a similar manner, each authority 104 also stores a public modulus APM and a secret exponent ASE that it uses to generate a digital signature.

A pending command register (PCR) 150 is used to track the progress of commands requiring multiple signatures, as described below.

A PKSC control block (PCB) 152 contains a set of masks 154 specifying various authorizations for the authorities 104 and the like, followed by a signature requirement array (SRA) 156 specifying signature requirements for each of a plurality of command types.

In addition to the storage areas described above, crypto module 102 contains a crypto configuration control (CCC) 158, a storage area containing various fields for specifying the operation of the crypto module.

Finally, crypto module 102 contains a pseudorandom number generator (PRNG) 160 for generating in a cryptographically secure manner the various random numbers used in the cryptographic procedures performed by the crypto module. PRNG 160 is described in the following copending applications of R. S. DeBellis et al., filed May 15, 1997, and incorporated herein by reference:

"Pseudorandom Number Generator", Ser. No. 08/856,562 (docket PO997046);

"Pseudorandom Number Generator with Backup and Restoration Capability", Ser. No. 08/856,882 (docket PO997049);

"Pseudorandom Number Generator with Normal and Test Modes of Operation", Ser. No. 08/856,828 (docket PO997058);

In addition to the registers already described, crypto module 102 also contains various master key registers and transport registers, indicated collectively as REGS 162 in FIG. 1 and illustrated more fully in FIG. 16 of the copending application of R. M. Smith, Sr. et al. (docket PO997092) referred to above.

Security Assumptions

As already stated, FIG. 1 shows an attacker 108 in the network 106 between the authorities 104 and the crypto module 102. This is to indicate the types of attacks which the disclosed public key security control is designed to prevent. It is assumed that information in the crypto module 102, in the workstations 110, and associated with security officers 112 is secure, but all information to and from the crypto module may be monitored, altered, rerouted, or discarded by the attacker 108 and that additional messages may be inserted into the network 106 by the attacker 108.

It should be noted, however, that an attacker 108, to be successful, must be subtle. Thus, for example, if an attacker 108 were to simply refuse to transmit any messages, such an action would make it immediately obvious to all in the network 106 that the network is broken and the attacker would be discovered and removed.

Types of Authorities

In FIG. 1, both workstations 110 and security officers 112 are shown as authorities 104. This is to indicate that the secret key used to sign a message from an authority 104 may be associated either with the workstation 110 or with the security officer 112. The secret key associated with a workstation 110 remains with the workstation. In the case of a secret key associated with a security officer 112, the key may be carried on a security card and then read into the workstation 110, but when the security officer 112 leaves, the key is erased from that workstation 110. Thus, the secret key moves with the security officer 112 from one workstation 110 to another.

PKSC Security

Security provided by the PKSC consists of separate mechanisms to provide integrity and secrecy. At initialization time, security is built up in stages, first integrity of the crypto module 102, then integrity of the authorities 104, and finally these integrity mechanisms are used as part of the process to establish secrecy.

Initial State

The crypto module 102 receives power from two sources: regular power and battery back up. If power from both sources is removed, all volatile storage in the crypto module 102 is erased. This is called crypto module reset. Crypto module reset is also performed by the Initialize Crypto Module (ICM) PKSC command.

After crypto module reset, the crypto module 102 is available on a first-come-first-served basis, that is, anyone, including an attacker 108, can take control of the crypto module 102. However, since no secret information is shared during the first parts of initialization, there is no exposure to loss of security during this part of the process.

At each step of the initialization process, each of the authorities 104 can examine the state of the crypto module 102 and ensure that control has been properly established and that only the proper authorities have been given control. Thus, if an attacker 108 takes control during this process, the rightful authorities 104 soon become aware of this and refuse to cooperate and do not provide any of the essential information necessary to use the crypto module 102 in a useful application.

PKSC Integrity

Most of the communication between crypto module 102 and the authorities 104 is not secret, but does require integrity. Integrity of communication is ensured by means of public key digital signatures.

Public key cryptography as used for data privacy, digital signatures and the like is well known in the art. Whereas conventional (or symmetric) cryptography such as the Data Encryption Standard (DES) uses the same secret key for both encryption and decryption, public key (or asymmetric) cryptography uses separate keys for encryption and decryption. A person wishing to receive a message generates a key pair in such a manner that the decryption key cannot be feasibly derived from the corresponding encryption key of the pair. The person then makes the encryption key public while keeping the decryption key secret. Anyone having access to the public encryption key can encrypt a message to the receiver. However, only the receiver can decrypt the message, since only he possesses the decryption key and no other person can feasibly derive the decryption key merely from knowledge of the public encryption key.

Perhaps the best known example of public key encryption is RSA encryption, named after its originators Rivest, Shamir, and Adleman. RSA is described in B. Schneier, Applied Cryptography, 1996, pp. 466–471, and in U.S. Pat. No. 4,405,829, both incorporated herein by reference. In RSA encryption, a person wishing to receive an encrypted message generates a public modulus n, a private exponent d and a public exponent e. The public modulus n and the public exponent e together constitute the public key. A sender transforms a plaintext message m into a ciphertext block c by performing the modular exponentiation operation $c = m^e \bmod n$, while similarly the receiver decrypts the ciphertext block c to recover the plaintext message m by performing the inverse operation $m = c^d \bmod n$.

Although public key encryption is more computationally intensive than conventional encryption, it has the singular advantage that it does not require the secret transmission of a key. All that is required is that the public encryption key be communicated to potential users with integrity, so that the users are assured that the public key actually originates from the recipient and has not been altered.

Similar public key techniques may be used for digital signature generation and verification. Here too, a public/private key pair is generated. The private key is used to encrypt a hash or digest of the original message to generate a message signature. The public key is used to verify the signature by generating a similar hash of the message, decrypting the received signature, and comparing the two results. Only the possessor of the private signature key can sign a message, whereas anyone having access to the public key can verify the message signature.

Although the RSA public key cryptosystem is used in the disclosed embodiment, the invention is not limited to this particular public key cryptosystem, and other cryptosystems may be used. Thus, while references to keys herein are to RSA keys, the invention is not so limited.

Messages requiring integrity from the crypto module 102 to the authorities 104 are signed by the crypto module using its own secret key (CMSE) 144 and verified by the authority using the crypto module public key. Similarly, messages requiring integrity from an authority 104 to the crypto module 102 are signed by the authority using its own secret key (ASE) and verified by the crypto module using the public key of the authority.

To ensure the integrity of this communication, it is necessary to install the public key of the sender in the receiver with integrity.

Crypto Module Key Generation

During the manufacturing process, a unique 128-bit crypto module ID (CMID) 146 and a unique 1024-bit RSA key is generated for each crypto module 102. As described above, an RSA key consists of a public modulus, a public exponent, and a private exponent. The public exponent for all PKSC RSA keys is a fixed value of 65,537 ($2^{16}+1$). The public modulus part of this RSA key is called the crypto module public modulus (CMPM). The CMID, the crypto module secret exponent (CMSE), and the hash pattern hp(CMPM) of the crypto module public modulus CMPM are placed in nonvolatile storage 140 in the crypto module 102. CMPM 142 is 128 bytes in length and can be queried by means of a Query Module Information (QMI) PKSC query command 114 to be described; the corresponding hash pattern hp(CMPM) is stored at 143. CMSE 144, which is kept secret, is placed within shielding to prevent discovery of the value without destruction of the chip.

During the manufacturing process, CMSE 144 is used to sign four PKSC commands 116: an Initialize Crypto Module (ICM) command which loads CMPM 142 and sets the CCC 158 to disable all functions except for the initialization commands, and three Load Initialization Modulus (LIM) commands which load the public modulus APM of three different initialization authorities 104. Depending on the manufacturing process, additional ICM commands 116 which set up some of the most common configurations may also be signed. After CMSE 144 is placed in the crypto module 102, and all of these self-signature initialization commands 116 have been signed, the CMSE value is erased and no record of this information (outside of the tamper-proof area 144) is kept.

CMID 146 and the signatures of the four commands are kept in a special database called the crypto module certification center database. If additional signatures were generated, then this information is also placed in the database, but these signatures must be kept secret.

Crypto Module Certification Center

To provide integrity, it is necessary for each of the authorities 104 to verify that they are communicating with the intended crypto module 102 and not being routed to an incorrect or fictitious crypto module simulated by an attacker 108.

Authentication of the crypto module 102 is done by means of a Crypto Module Certification Center provided by a suitable certification authority, such as the manufacturer of the crypto module 102. The certification center maintains a list of all crypto modules 102 produced by the manufacturer and the current status of each. Status includes the public modulus 142 (CMPM) of the crypto module 102, the signatures 118 of the four self-signed initialization commands 116, and other information such as where the crypto module is installed and whether it has been replaced, or reported missing or stolen.

During the initialization process, the authority 104 begins by querying the crypto module 102 using the Query Module Information (QMI) PKSC command 114. Since the crypto module 102 has not yet been initialized, the response is not signed, 124 but it does contain the crypto module ID (CMID) 146.

Figure 12:
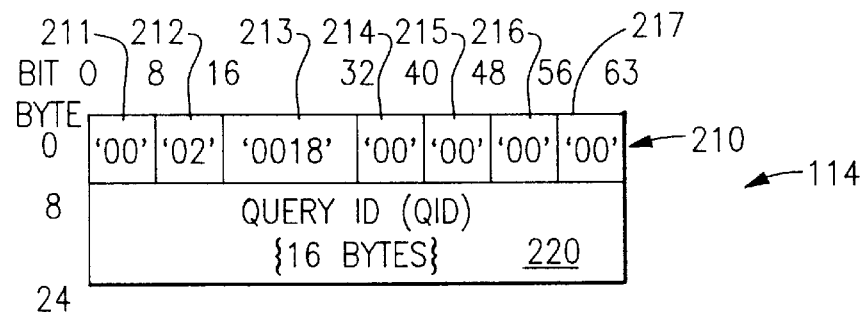
FIG. 12 shows the format of a Query Module Information (QMI) query.
Figure 13:
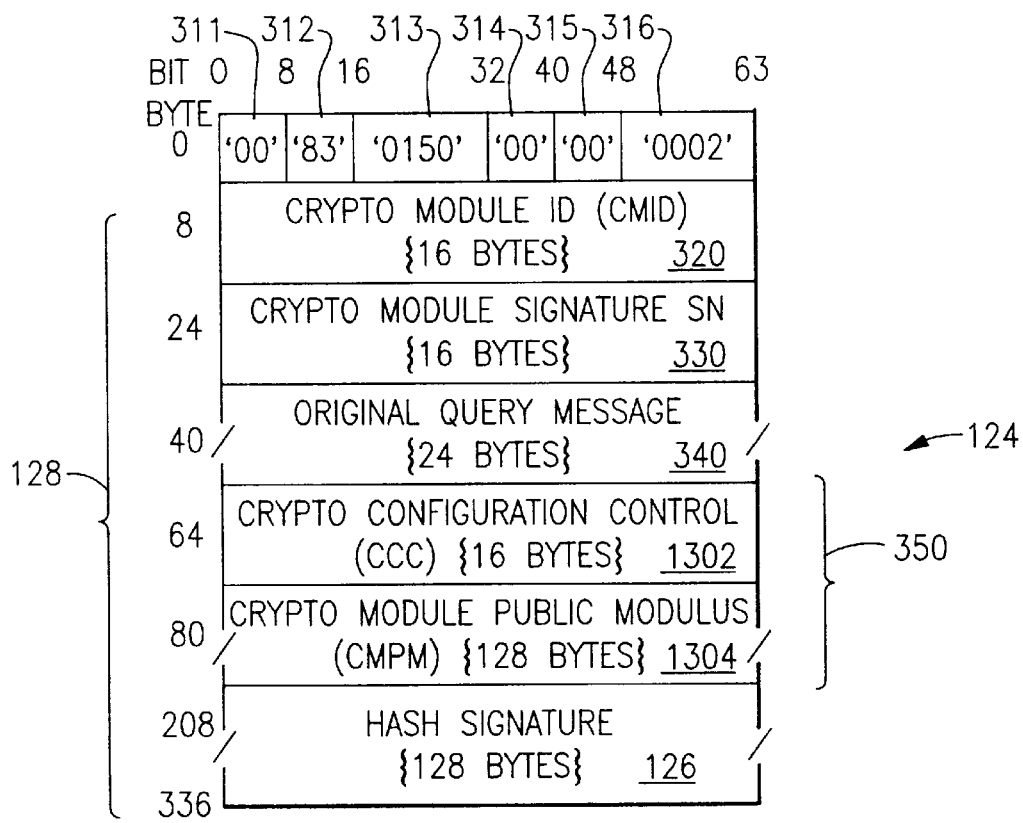
FIG. 13 shows the format of a reply to a QMI query.

FIG. 12 shows the format of a Query Module Information (QMI) query 114, while FIG. 13 shows the format of a reply 124 to a QMI query. In the query header 210, the field 214 ('00') identifies the query 114 as being a QMI query. In the reply 124, the return data 350 comprises a copy 1302 (16 bytes in length) of the crypto configuration control (CCC) information 158, followed by a copy 1304 of the crypto module public modulus (CMPM) 142 (128 bytes in length).

The authority 104 then calls the certification center, perhaps by means of an 800 number, and requests information concerning this particular crypto module ID. The certification center then checks its database to verify the status of the crypto module 102 identified.

Depending on the configuration to which the end user is entitled, and, in some cases, depending on positive identification of the authority 104, the certification center may send the authority 104 a single Initialize Crypto Module (ICM) PKSC command which establishes the CMPM and also the final values for the crypto configuration control, or the certification center may send signatures for the ICM command and two of the three Load Initialization Public Modulus (LIM) commands. When multiple initialization commands are required, the crypto module certification center must communicate with the crypto module 102 in an interactive manner to set up the desired configuration.

At the completion of the initialization process, the authority 104 issues the Query Module Information (QMI) command. If the certification center has given an acceptable report for this particular crypto module 102, if the initialization commands have been accepted, and if the response to the QMI verifies using the public key of the crypto module, then the authority 104 can be assured that communication is to the desired crypto module and not an alternate or a fictitious one.

Establishing Integrity of the Authorities

After the initialization process is complete, a command from an authority 104 to the crypto module 102 is performed by the crypto module only if the crypto module can verify the integrity of the command, that is, that the command came from a source authorized to control this crypto module 102. This is accomplished by installing the public keys of the authorities 104 in the crypto module 102.

PKSC Commands

Commands from authorities 104 to the crypto module 102 may be either unsigned requests or queries 114 or signed commands 116. Signed commands are of five types: single-signature, multiple-signature, cosignature, self-signature initialization, and two-signature initialization.

All information in the crypto module 102 except that specifically marked as secret can be obtained by means of queries 114. In the case of most secret information, the hash pattern of the secret information is provided. Queries 114 are unsigned and are sent from the authority 104 to the crypto module 102. Included in the query 114 is a 16-byte query ID (QID) field 220 (FIG. 2), which is a random number generated by the workstation 110 and used only once. The reply 124 to a query 114 is signed by the crypto module 102 and contains, as part of its copy 340 of the original query 114, the QID 220 from that query. The use of the QID eliminates the possibility of replay by an attacker 108. Thus, the authority 104 is assured of up-to-date information.

Single-signature commands 116 are used to operate on information in the crypto module 102 which does not need to be authenticated by multiple authorities 104. When the PKSC signature verification control (CCC bit 7) is zero, single-signature commands 116 are accepted without verification. When the PKSC signature verification control (CCC bit 7) is one, single-signature commands 116 are accepted if signed by any of the authorities 104 listed in the authority registers 134.

Multiple-signature commands 116 are not executed directly, but are placed in the pending command register (PCR) 150 and held pending until sufficient cosignatures 118 have been received to meet the requirements for that particular type of command. The signature requirement array (SRA) 156 contains the requirements for each type of multiple-signature command.

When a multiple-signature command 116 is placed in the PCR 150, a 16-byte value (PCID) is generated and placed in the PCR. This permits each authority 104 to query the appropriate fields in the crypto module 102 before cosigning the pending command 116. If, during this time, any of the authorities 104 were to change the pending command, a new PCID would be generated and the Cosign command intended to cosign one command could not be misused to sign a different one.

Crypto Module ID (CMID)

During the manufacturing process, a unique 128-bit value is generated for each crypto module 102. This, value, called the crypto module ID (CMID), is 16 bytes in length and is returned in all PKSC reply messages sent by the crypto module 102.

PKSC Control Block (PCB)

PKSC control block (PCB) 152 contains the primary controls for controlling and restricting the PKSC commands 116. FIG. 5 shows the PKSC control block 152, which consists of four mask fields 502, 504, 506, 508 and the signature requirement array (SRA) 156. The PCB 152 can be queried by means of the Query Control Block (QCB) PKSC query 114 and can be loaded by means of the Load Control Block (LCB) PKSC command 116. The PCB 152 is 80 bytes in length and is set to all zeros by crypto module reset.

Signature Requirement Array (SRA)

Signature requirement array (SRA) 156 is provided to accommodate different user environments and requirements and may be set during initialization to indicate which authorities 104 are permitted to execute or cosign a particular multiple-signature command 116.

Referring to FIGS. 6–7, SRA 156 contains an entry 602 for each of ten different multiple-signature commands 116 in the disclosed embodiment. Each entry 602 indicates which authorities 104 are eligible to execute, or cosign, and how many signatures 118 are required to meet the requirement. A pending command 116 is not executed until all the requirements for that command have been met.

Thus, for example, SRA 156 can be set up to permit any two out of three security officers 112 to issue a Load Environment Control Mask (LEC) command 116 from any workstation 110. The SRA entry 602 for a Load PKSC Control Block (LCB) command 116, on the other hand, might be set up to require a different set of security officers 112 and require signatures 118 from both security officers and work stations 110.

In the disclosed embodiment, the signature requirement array (SRA) 156 contains ten 8-byte entries 602, one for each of the ten multiple-signature commands 116. Each SRA entry 602 contains three signature requirement specifications. FIGS. 6–7 show the signature requirement array 156 and a signature requirement array entry 602.

Each signature requirement specification consists of a 4-bit count 704 and a 16-bit mask 706. The 16-bit mask 706 indicates which authority signatures 118 are eligible to be counted for that requirement and the count 704 indicates how many signatures are required to meet the requirement. If the count 704 is zero, then the requirement is considered to be satisfied and the mask 706 is ignored. In the present embodiment, bits 0–3 (r) of the signature requirement array entry 602 make up a reserved field 702; the bits are not examined by the machine, but should be set to zero. Bits 4–7 (C1), 8–11 (C2), and 12–15 (C3) of the signature requirement array entry 602 are the first, second, and third counts 704, respectively. Bits 16–31, 32–47, and 48–63 of the signature requirement array entry 602 are the first, second, and third masks 706, respectively.

Pending Command Register (PCR)

Figure 8:
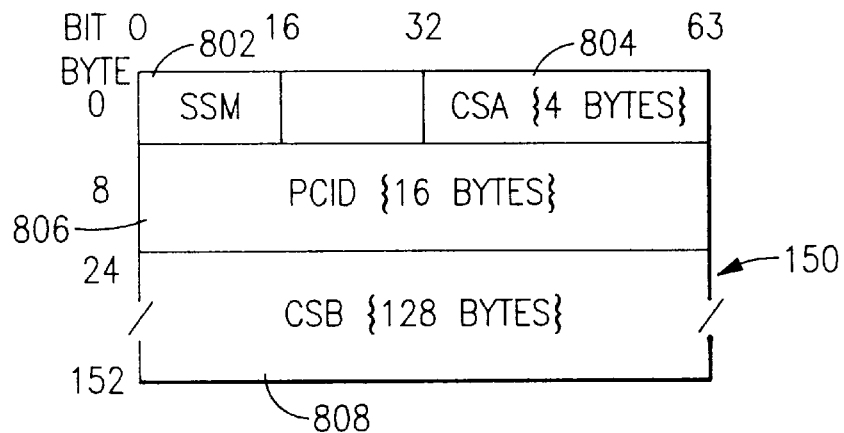
FIG. 8 shows the pending command register (PCR).

A PKSC command 116 which requires multiple signatures 118 is placed in the pending command register 150 while the multiple signatures are being processed. Queries 114 and cosign commands 116 can be performed while a command is held in the PCR 150. All single-signature and self-signature initialization commands 116, however, cause the PCR 150 to be cleared. FIG. 8 shows the pending command register 150.

Bits 0–15 of the PCR 150 are a signature summary mask (SSM) 802. These bits correspond to authorities 104 (A0–A15) and indicate which authorities have signed (or cosigned) the pending command 116.

Figure 10:
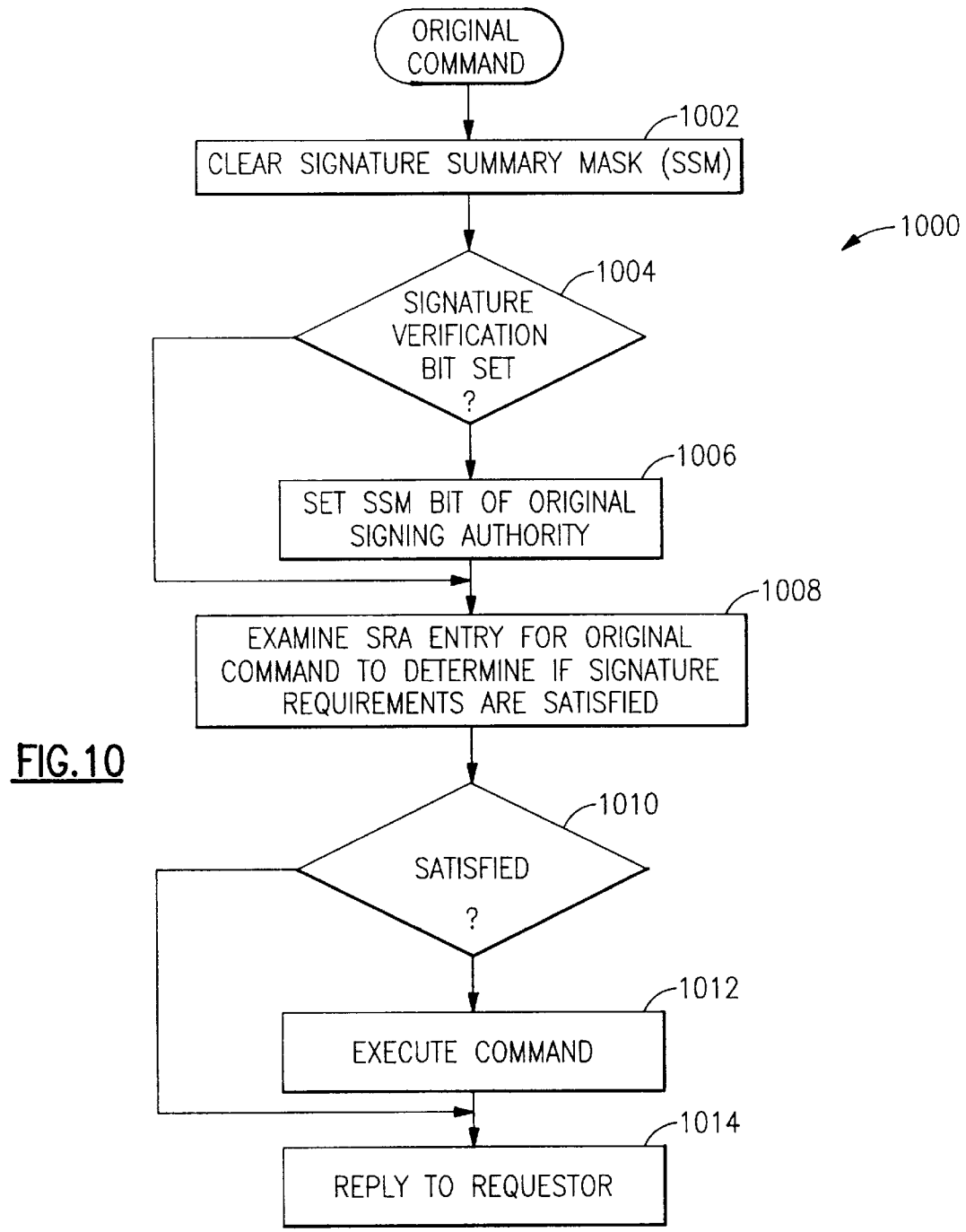
FIG. 10 shows the general procedure for processing the original command of a multiple-signature command.

FIG. 10 shows the general procedure 1000 for processing the original command of a multiple-signature command. When a command 116 is loaded into the PCR 150 all SSM bits are set to zero (step 1002). Then, if PKSC signature verification (CCC bit 7) is one (step 1004) and signature verification for the command is successful, the SSM bit corresponding to the authority 104 signing the command 116 is set to one (step 1006).

The SRA entry 602 for the command 116 in the PCR 150 is then examined to determine if all three signature requirement specifications for the pending command are satisfied (step 1008). For this to occur, for each of the three requirements, the required number (as indicated by a particular count 704) of authorities who are permitted to concur (as indicated by the corresponding mask 706) have in fact concurred. If not, then a normal completion reply is returned (step 1014). If all three signature requirement specifications are satisfied (step 1010), then the PCR execution phase for the pending command 116 takes place (step 1012) before the normal completion reply is returned for the original command (step 1014).

As described below, each time a Cosign command 116 is successfully executed, the SSM bit corresponding to the signing authority 104 of the Cosign command is set to one. Commands 116 may be loaded and cosigned by any of the authorities 104 regardless of whether that authority is listed in the signature requirement array 156 as a required signer for the command, but the pending command is not executed until all the signature requirements for the particular command are satisfied.

When the PKSC signature control is zero, commands 116 may be loaded into the PCR 150 even though the signature 118 for the command is not valid. However, the SRA entry 602 for the command must 116 be satisfied before the pending command is executed. Thus, when the PKSC signature control is zero, and all the count fields 704 in the SRA entry 602 are zero, then the command 116 is executed without requiring any valid signature 118. But if any count field 704 in the SRA entry 602 is nonzero, then valid cosignatures 118 are required to execute the command even when the PKSC signature control is zero.

Bits 32–63 of PCR 150 contain a command section A (804) for storing fields 414–417 of the original multiple-signature command.

Bytes 8–23 of PCR 150 contain a pending command identifier (PCID) 806 formed from the hash pattern of the multiple-signature command. The Cosign command 116 to be described contains a 16-byte field which must match this value in order to cosign the command.

Bytes 24–151 of the PCR contain a command section B (808) for storing the field 440 of the original multiple-signature command.

Pending command register (PCR) 150 is 152 bytes in length and can be queried by means of a Query Pending Command Register (QPC) PKSC query 114. PCR 150 is set to all zeros by crypto module reset. PCR 150 is set to all zeros at the completion of PCR execution and the PCR is also set to all zeros whenever a single-signature command 116 or self-signature initialization command is accepted.

PKSC Cosignature Command

Although there are ten different PKSC multiple-signature commands 116, a single PKSC command, the Cosign command, can be used to provide the additional signatures 118 required for any of the ten multiple-signature commands. The Cosign command 116 also provides signatures 118 for the two-signature initialization command Load Crypto Configuration Control (LCC).

After one authority 104 has loaded the PCR 150 with a multiple-signature command 116, another authority can use the Query Pending Command Register (QPC) query to determine what command is pending and thus determine whether the authority is willing to cosign the pending command. The 16-byte pending command ID (PCID) field 806 in the PCR 150 provides an authority 104 with the assurance that the command being cosigned has not been changed since it was examined by the authority.

Figure 9:
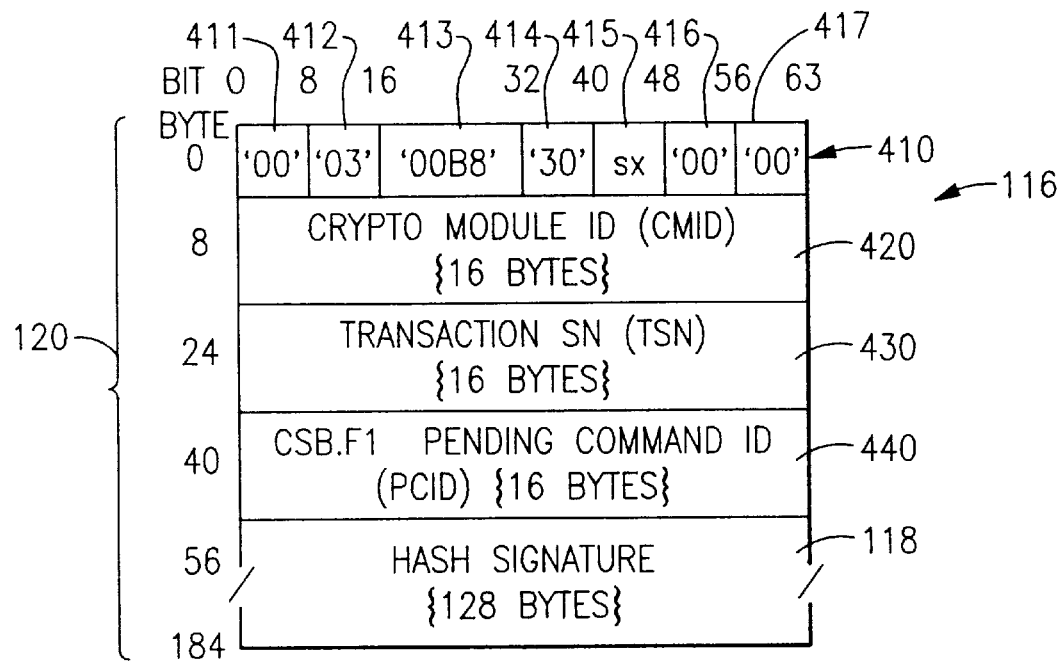
FIG. 9 shows the format of a Cosign (COS) command.

FIG. 9 shows the format of a Cosign command 116 in the disclosed embodiment. It conforms to the general format shown in FIG. 4, with fields 413–414 and 416–417 having the respective hexadecimal values '00B8 ', '30 ', '00 ', '00' and field 415 containing the identifier (sx) of the issuing authority 104. In the case of the Cosign command, the command data 440 (CSB.F1) comprises the 16-byte pending command ID (PCID) obtained by querying the pending command register 150.

A Cosign PKSC command 116 is accepted only if the CSB.F1 field 440 of the request message 120 is not zero and matches the PCID 806 of the PCR 150. Thus, since the PCID 806 is changed each time the PCR 150 is loaded, a Cosign command 116 based on a previous command will not be accepted after the PCR is changed, and since the PCID is set to zero when the PCR is reset, the PCR cannot be cosigned while it is reset.

Figure 11:
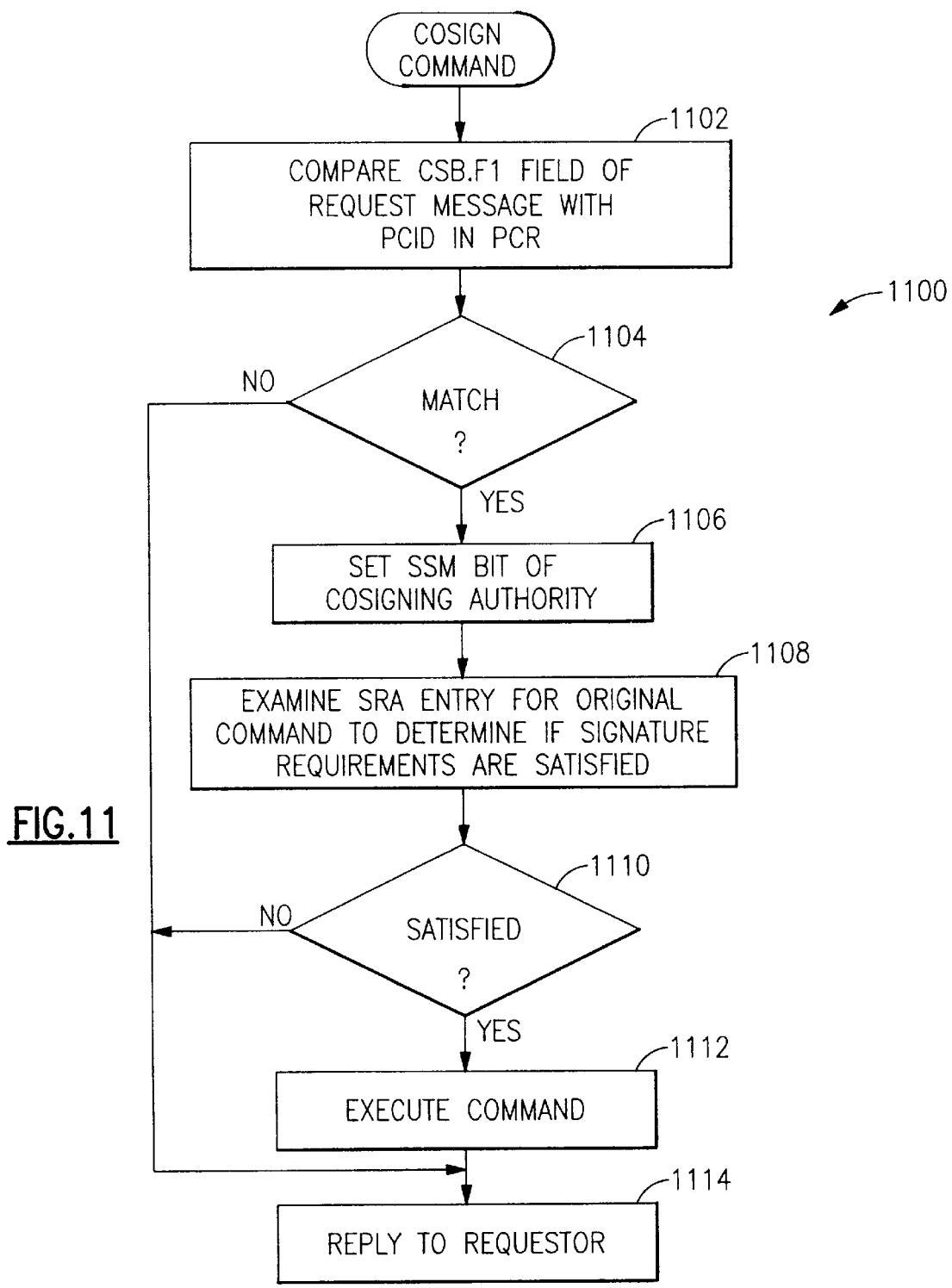
FIG. 11 shows the procedure for processing a Cosign command.

FIG. 11 shows the procedure 1100 for processing a Cosign command 116, assuming the signature verification for the command is successful. During execution of the Cosign command 116, crypto module 102 compares the CSB.F1 field 440 in the command with the PCID 806 in the pending command register 150 to determine if the two match (step 1102). If the CSB.F1 field 440 matches the PCID 806 in the pending command register 150 (step 1104), then the pending command 116 is cosigned for this authority 104. This is accomplished by setting bit sx of signature summary mask 802 to one in the pending command register 150, where sx is the authority identifier contained in field 415 of the Cosign command 116 (step 1106).

The SRA entry 602 for the command 116 in the PCR 150 is then examined to determine if all three signature requirement specifications for the pending command are satisfied (step 1108). If not, then a normal completion reply is returned (step 1114). If all three signature requirement specifications are satisfied (step 1110), then the PCR execution phase for the pending command 116 takes place (step 1112) before the normal completion reply is returned for the Cosign command (step 1114).

Signature verification always applies to COS regardless of the setting of the PKSC signature control (CCC bit 7).

Authorization Registers

Those registers which are replicated for each authority 104 are called authorization registers. The maximum number of authorities 104 supported is 16.

Authorization Public Modulus (APM)

The authorization public modulus is 128 bytes in length and can be queried by means of the QAR PKSC query command. Crypto module reset causes each APM to be set to zero, which is invalid.

Figure 14:
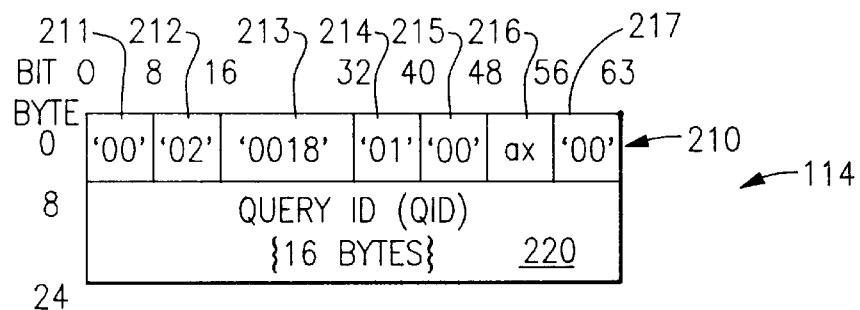
FIG. 14 shows the format of a Query Authorization Register (QAR) query.
Figure 15:
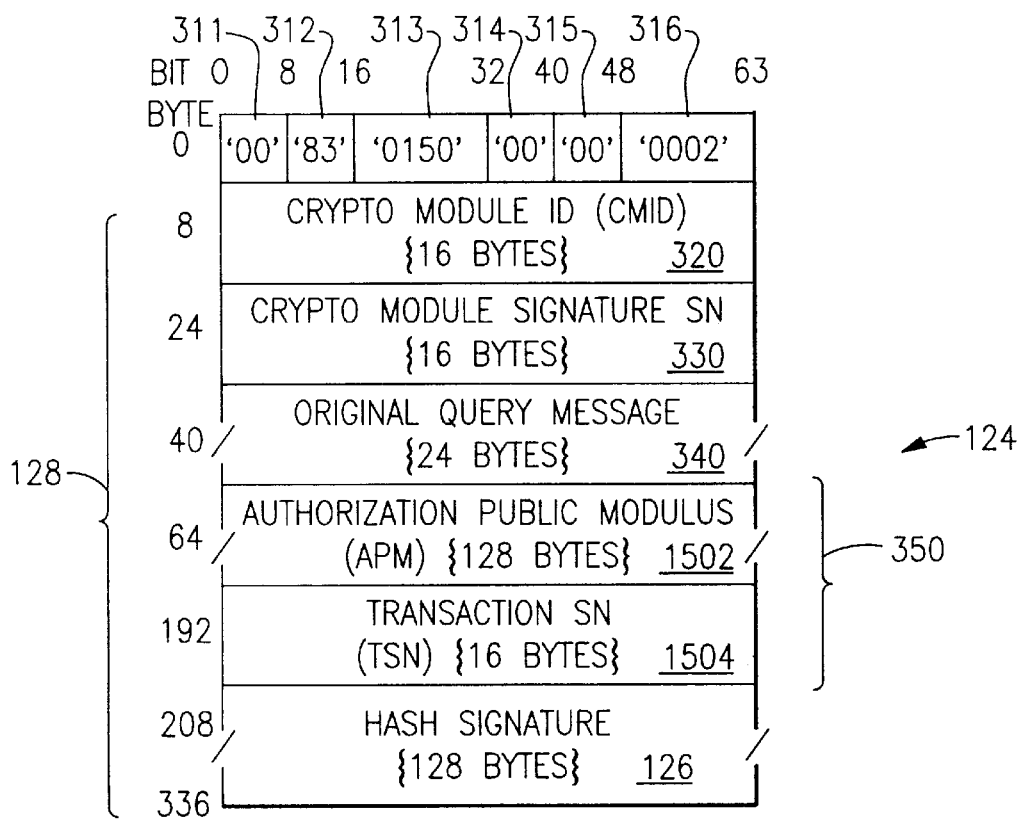
FIG. 15 shows the format of a reply to a QAR query.

FIG. 14 shows the format of a Query Authorization Register (QAR) query 114, while FIG. 15 shows the format of a reply 124 to a QAR query. In the query header 210, the field 214 ('01') identifies the query 114 as being a QAR query, while the field 216 (ax) identifies the particular authority 104 for which the information is being requested. In the reply 124, the return data 350 comprises a copy 1502 (128 bytes in length) of the authorization public modulus (APM) 136, followed by a copy 1504 of the transaction sequence number 138 (16 bytes in length).

During the initialization process controlled by the customer, each authorization register will be initialized with the public modulus of a particular authority 104. It is necessary, however, before the customer program begins, for an IBM supplied bootstrap program to be run. Since the APM of all authorization registers is reset to an invalid value by crypto module reset, the bootstrap program must set a valid value into at least one of these registers before the PKSC signature control (CCC bit 7) is set to one. It is suggested that the bootstrap program set the APM to the following value, which is the product of two primes: $(2^{512}-569)(2^{512}-629)$.

Transaction Sequence Number (TSN)

Associated with each authorization register is a 16-byte value called a transaction sequence number (TSN). The TSN can be queried by means of the QAR PKSC query command.

All commands requiring a signature by the authority also include a TSN in the command. The TSN is used to eliminate the possibility of an attacker successfully replaying a previously signed command. The use of the TSN depends on the setting of the PKSC TSN control (CCC bit 6). When CCC bit 6 is zero, the TSN in the command is ignored. When CCC bit 6 is one, the command is accepted only if the TSN in the command matches the current TSN for that authority. Regardless of whether the TSN in the command is tested, each time a command is accepted, the crypto module updates the TSN in the associated authorization register. (A command is considered to be accepted only when a reply code of '00' is returned.) The TSN is updated by incrementing the rightmost 8 bytes of the TSN by one; a carry, if any, out of the rightmost 8 bytes is ignored.

Whenever an authorization register is loaded, a new 16-byte random number is placed into the TSN for that register. Crypto module reset causes zeros to be placed into the TSN for each authorization register.

Crypto Module Signature Sequence Number (CMSSN)

The crypto module signature sequence number (CMSSN) is 16 bytes in length. The CMSSN is initialized to a random value by crypto module reset. All messages signed by the crypto module contain the current CMSSN. Each time, after it is used, the CMSSN is updated by incrementing the rightmost 8 bytes by one; a carry, if any, out of the rightmost 8 bytes is ignored.

FIG. 18 shows the general CMSSN processing procedure 1800. Each time it generates a signed reply 124 to an authority 104, crypto module 102 inserts the current CMSSN 148 in the reply (step 1802) and then increments the right half of the CMSSN (step 1804). Whereas a different TSN 138 is stored for each authority 104, a single CMSSN 148 is maintained for the authorities collectively.

Crypto Configuration Control (CCC)

FIG. 16 shows the format of the crypto configuration control (CCC) 158.

The crypto configuration control (CCC) 158 is 16bytes in length and can be queried by means of the QMI PKSC query command. The CCC 158 contains controls to enable and disable all the major components of the crypto module. The CCC 158 contains bits and fields to control functions subject to export control such as CDMF, full DES, and DH modulus size. The CCC 158 also contains bits to control major functions which may be separately announced or sold. There are also bits to control certain of the initialization functions. The CCC 158 is loaded by special PKSC functions, called initialization functions. The CCC 158 is set to all zeros by crypto module reset.

FIG. 18 shows the CCC bit and field assignment. FIG. 19 shows the functions controlled by CCC enable bits. FIG. 20 shows the functions controlled by the CCC KEK size (KSZ) fields. FIG. 21 shows the functions controlled by the CCC modulus size fields.

Reserved (0): Bits 4, 12, 13, 30, 31, 37–39, 65, 67, 69, 80–91, and 108–111 are reserved.

Basic PKSC Enable (P): Bit 0 controls execution of the following basic PKSC commands:

All queries, except Query Module Information (QMI)

Combine DH Key Parts (CHK)

Load DH Modulus (LHM)

Load G and Generate DH First Part (LHG)

Load Environment Control Mask (LEC)

Load PKSC Control Block (LCB)

Zeroize Domain (ZD)

When bit 0 is one, these PKSC functions can be executed. When bit 0 is zero, they are disabled and an attempt to execute the command results in a configured command abnormal reply.

PKSC Initialization Enable (I): Bit 1 controls execution of the Load Initialization Public Modulus (LIM) and Load Crypto Configuration Control (LCC) PKSC commands. When bit 1 is one, these functions can be executed. When bit 1 is zero, they are disabled and an attempt to execute the command results in a configured command abnormal reply.

PKSC XEM Enable (X): Bit 2 controls execution of the Extract and Encrypt Master Key (XEM) PKSC command. When bit 2 is one, this function can be executed. When bit 2 is zero, it is disabled and an attempt to execute the command results in a configured command abnormal reply.

PKSC LKP Enable (L): Bit 3 controls execution of the Load Key Part (LKP) PKSC command. When bit 3 is one, this function can be executed. When bit 3 is zero, it is disabled and an attempt to execute the command results in a configured command abnormal reply.

Crypto Module Test Mode (T): When CCC bit 5 is one, the crypto module is in crypto module test mode. When CCC bit 5 is zero, the crypto module is in crypto module normal mode. Crypto module test mode enables several testing functions, including execution of the PKSC Diagnose function and testing of the pseudo-random number generator. The setting of CCC bit 5 affects the pseudo-random number initialization count (PRNIC), as defined in the copending DeBellis et al. applications referred to above. When CCC bit 5 is one, the PRNIC is always zero. When an LCC command changes CCC bit 5 from one to zero, or an ICM command sets CCC bit 5 to zero (regardless of the old value), the PRNIC is set to 127. When an LCC command sets CCC bit 5 to zero and CCC bit 5 was already zero, the PRNIC is unchanged.

PKSC TSN Control (Y): Bit 6 controls whether TSN checking is performed on PKSC signed commands. When bit 6 is zero, TSN checking is not performed. When bit 6 is one, TSN checking is performed. TSN checking is never performed for the self-signature initialization commands and thus bit 6 has no affect on the execution of these commands.

PKSC Signature Control (Z): Bit 7 controls whether signature verification is performed on single-signature, two-signature, and multiple-signature PKSC signed commands. When bit 7 is zero, signature verification is not performed for these commands. When bit 7 is one, signature verification is performed. Signature verification is always performed for the Co-Sign command and the self-signature initialization commands and thus bit 7 has no affect on the execution of these commands.

ICRF Enable Bits: Bits 8–31 control all ICRF functions except generate MDC (GMDC2, GMDC4), generate SHA (GSHA0, GSHA1), generate pseudo-random number (GPRN), disable key part register (DKR), set MKVN register to zero value (SMR-z), and set CDX Register (SCR). FIG. 18 shows the CCC bit and field assignment. FIG. 19 shows the functions controlled by CCC enable bits. When the bit associated with a particular ICRF function is one, the function can be executed. When the bit is zero, it is disabled and an attempt to execute the ICRF function results in response code '0D', CCC 158 disabled.

CCC KEK Size (KSZ) Fields: Bits 32–39 control the size of the key encryption key which can be used by certain ICRF and PKA functions. FIG. 20 shows the functions controlled by these bits.

PKSC Enable Bits: Bits 40–47 control eight PKSC commands. FIG. 19 shows the PKSC commands controlled by these CCC enable bits. When the bit associated with a particular PKSC command is one, the command can be executed. When the bit is zero, the command is disabled and an attempt to execute the PKSC command results in a configured command abnormal reply.

Initialization Authority Flags (IAF): Bits 48–63 indicate, for each of the 16 authorization registers, whether the register holds an initialization public modulus.

Execution of the Load Initialization Public Modulus (LIM) PKSC command causes the IAF bit corresponding to the target authorization register to be set to one. Execution of the Load Authorization Public Modulus (LAP) PKSC command causes the IAF bit corresponding to the target authorization register to be set to zero. These bits can also be set by the ICM and LCC commands, but normally the ICM and LCC commands would be used only to set these bits to zero.

Configured Modulus Computation.

The crypto configuration control (CCC) includes eight 4-bit size fields which control the maximum modulus size which can be used by various PKSC and PKA commands. These size fields permit the crypto module to be configured to meet export restrictions and also permit incremental pricing of function to the customer.

FIG. 17 shows the size of the modulus permitted by each of the 16 combinations of the four bits in the size field. As indicated in the figure, the first column shows the 4-bit selected CCC size field, the modulus must be smaller than the value in the second column, and the third and fourth columns indicate the number of leftmost bits, or number of leftmost doublewords, which must be zero in the modulus field.

PKA Size Fields: Bits 104–107 (DS), 112–115 (RS), 116–119 (RR), 120–123 (HS), and 124–127 (HR) control the maximum size of the modulus which can be used in the associated PKA commands. FIG. 21 shows the commands controlled by these CCC size fields. An attempt to execute these commands when the modulus specified in the request message exceeds the maximum permitted by this CCC field results in a PKA configured modulus abnormal reply.

PKSC DH Size Fields: Bits 92–95 (TD), 96–99 (TS), and 100–103 (TR), control the maximum size of the Diffie-Hellman modulus which can be used when executing the associated PKSC commands. FIG. 21 shows the commands controlled by these CCC size fields. An attempt to execute these commands when the value in the current DH modulus register exceeds the maximum permitted by this CCC field results in a PKSC configured modulus abnormal reply.

Before the crypto module 102 can be used it is initialized. This process is called crypto module initialization (CMI).

Preparation for CMI begins before the chips 102 are manufactured. RSA key pairs are created for two initialization authorities 104, RSA key pairs are created for each chip 102, and signatures are generated using the secret exponent (IASEA, IASEB, CMSE) of these keys. The records signed by the secret exponents are PKSC commands 116 which will be used to load information into the chip 102 as part of the CMI process. This information is kept in a database and is used during various stages of the manufacturing process. Some of this information, including the secret exponent CMSE of the RSA key for the chip 102, is sent to the chip manufacturing plant to be recorded on the chip as part of the manufacturing process. Other information, including PKSC commands 116 signed by the secret exponents CMSE, is later recorded on a crypto configuration diskette.

After a machine including the crypto module 102 has been installed at a customer site, information from the crypto configuration diskette is read onto a hard disk of an associated service processor. The configuration information is then loaded to the crypto module 102 as part of the initial microcode load (IML) process. Manual controls are provided which permit the operator to specify whether CMI is to be performed for a particular crypto module 102 as part of the IML process. This may include the options: (a) must be initialized, (b) must not be initialized, and (c) initialized only if currently not initialized.

After CMI is complete, the pseudorandom number generator 160 is initialized; this action is not performed as part of the CMI process, but is left to the program. It is described in the previously filed applications of DeBellis et al. referred to above.

Initialization Authority Key Pairs

As the first step in preparation for CMI, two RSA key pairs are generated. These are called initialization authorities (IAs), and are used to sign all CCC values subject to export control. FIG. 22 shows this information and the abbreviations used for the values.

Crypto Module Data Base

Before the crypto chips 102 are created, a unique RSA key pair is created for each chip. The secret exponent CMSE of the key is carefully protected until it has been used to sign several PKSC commands 116 and has been written securely into the chip 102; then it is destroyed. The PKSC commands 116 signed by the secret exponent CMSE of the key are used later in the CMI process for that chip 102. For each chip 102, the CMI process requires additional PKSC commands 116 which have been signed by the Initialization Authorities 104.

In this specification, all the individualized information associated with the chip 102, whether used to create the chip or to produce the CMI records for the chip, is shown in a single data base 2300 (FIG. 23) called the crypto module data base. It is recognized that in an actual implementation, this information could be organized into separate data bases.

Figure 37:
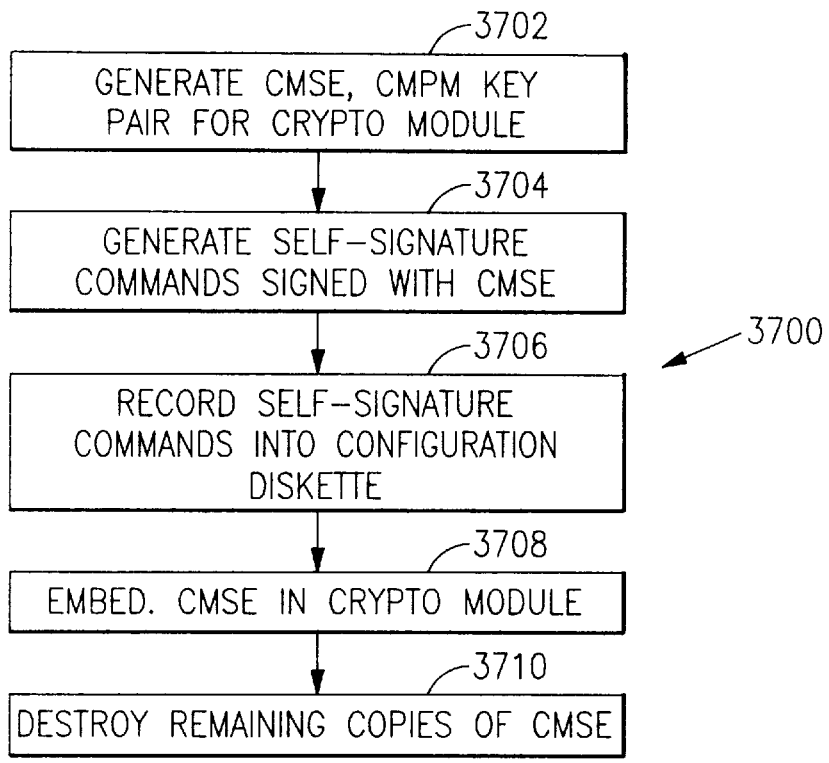
FIG. 37 shows the procedure for generating self-signed commands.

FIG. 37 recapitulates the general procedure 3700 for generating self-signed initialization commands 116. A key pair comprising a secret exponent CMSE and a public modulus CMPM are generated for the crypto module 102 in question (step 3702). One or more self-signed commands 116 signed with the secret exponent CMSE are then generated (step 3704) and recorded on a medium separate from the crypto module 102 (step 3706). The secret exponent CMSE is also written into the crypto module 102 in such a manner that an attempt to read the register 144 will destroy its contents (step 3708). Thereafter, any other copies of the secret exponent CMSE are destroyed (step 3710).

The information in the data base 2300 as described here includes a great deal of redundancy, but is presented in this way to make it clear what must be derived from the data base. It is expected that in an actual implementation, some of this redundancy would be eliminated. For example, each command contains the crypto module ID (CMID); this would normally be included only once as a separate field. The data base 2300 contains all the information necessary for the production of crypto configuration diskettes for the three standard export control level configurations and all the information necessary to permit the IAs 104 to later create and sign any desired CCC combination required for a particular chip.

FIG. 23 shows the general form of the crypto module data base 2300. Each row in the figure represents an individual chip 102. The column titled "Unit" in the figure shows the number of the row. The data base 2300 contains all the information necessary to manufacture the chip 102, including the 16-byte crypto module ID (CMID) 146, the 128-byte crypto module secret exponent (CMSE) 144, the 128-byte crypto module public modulus (CMPM) 142 and the 16-byte hash pattern hp(CMPM) of the crypto module public modulus CMPM. As mentioned earlier, the crypto module secret exponent CMSE is destroyed after the chip 102 has been created; this value is shown here for completeness.

There are two ICM groups (IGT and IG0), each containing a single ICM command IGT (FIG. 26) or IG0 (FIG. 27). The ICM commands 116 are self-signed by the secret exponent CMSE of the crypto module 102. The values for ccc.IT and ccc.I0 are shown in FIG. 24.

Figure 28:
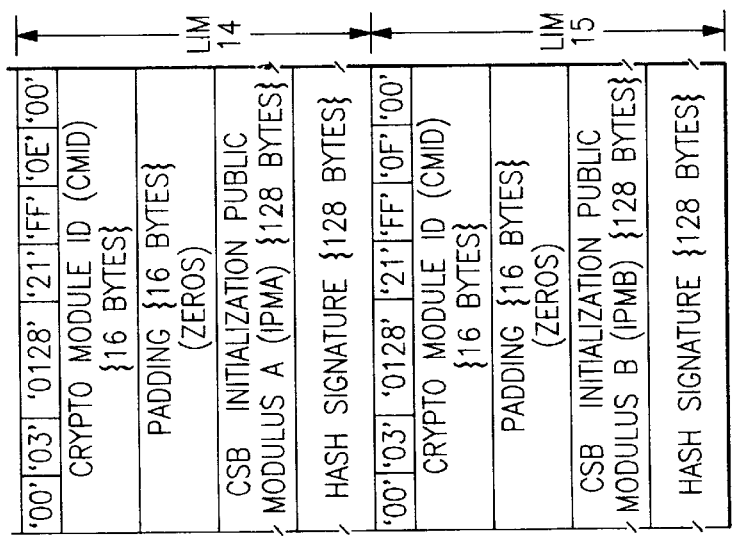
FIG. 28 shows the LIM group LG.

The LIM group LG, shown in FIG. 28, consists of two LIM commands 116 containing the public modulus (IPMA, IPMB) for Initialization Authorities A and B. The LIM commands 116 load these into authorization registers 14 (APM14) and 15 (APM15), respectively. The LIM commands 116 are self-signed by the secret exponent CMSE of the crypto module 102.

Figure 29:
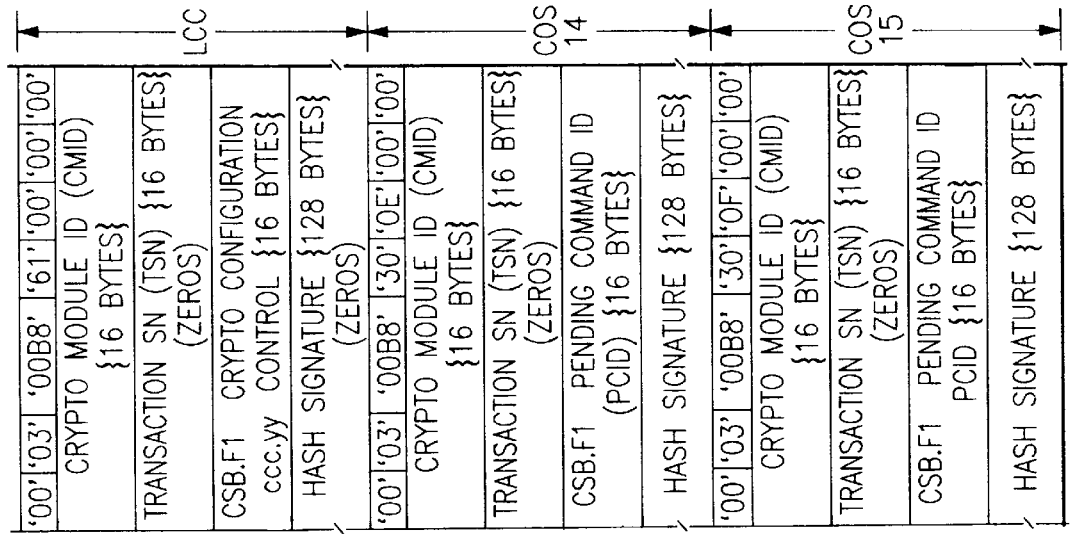
FIG. 29 shows the configuration group CG.yy.

The crypto module data base 2300 contains six configuration groups CG.yy, one of which is shown in FIG. 29. As shown in FIG. 29, each group consists of three PKSC commands 116: a Load Crypto Configuration Control (LCC) command followed by two Cosign (COS) commands. The LCC command 116 is not signed, the COS commands are signed by the secret exponents IASEA. IASEB of Initialization Authorities A and B, respectively. The value for ccc.yy is shown in FIG. 25.

Crypto Configuration Diskettes

Three lists of PKSC commands 116 are placed on the crypto configuration diskette. These are a load crypto test mode sequence, a zeroize sequence, and the regular CMI sequence for one of the two master key entry styles for the particular export control level for the crypto configuration diskette.

CMI Records

Figure 30:
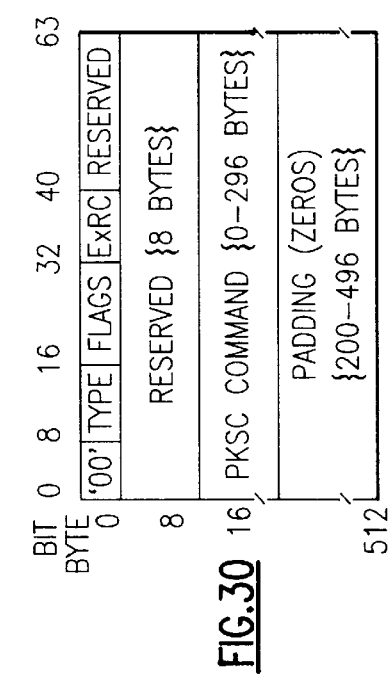
FIG. 30 shows the general format of the CMI records.

FIG. 30 shows the general format of a CMI record. A CMI record consists of three parts: the record header, which is 16 bytes in length, an optional PKSC command, which may be zero or a multiple of eight bytes in length, and padding of zeros which fills out the record to make it a fixed size of 512 bytes in length.

Self-Signature Initialization Commands

During the manufacturing process of the crypto module 102, when the RSA key is created for the crypto module, the secret exponent CMSE is used to sign several commands 116 which can later be sent to the crypto module. These commands 116 are called self-signature initialization commands.

Self-signature initialization commands 116 differ from all other signed commands in that the signature 118 is verified using the public RSA key of the crypto module 102 itself. This is indicated in the request message 120 (FIG. 4) by the value of 255 (hex 'FF')in bits 40–47 (field 415) in the request message. The signature verification is performed using the crypto module public modulus (CMPM) and a public exponent of 65,537 ($2^{16}+1$). In the case of ICM, the CMPM is supplied as part of the command and is checked for validity before it is used in the verification process.

Self-signature initialization commands 116 also differ from all other signed commands in that there is no TSN 430 associated with the crypto module public modulus (CMPM) and no TSN checking occurs. Thus, the self-signature initialization commands 116 can be replayed.

Crypto module reset initializes the crypto configuration control (CCC) 158 such that the only PKSC commands which can be issued are the Query Module Information (QMI) query 114 and the Initialize Crypto Module (ICM) command 116. QMI can be used to determine the crypto module ID (CMID) 146; ICM is then used to load the crypto module public modulus (CMPM) 142 and the crypto configuration control (CCC) 158.

As the first part of its operation, ICM performs crypto module reset, thus this command can be used at any time to clear out all information in the crypto module 102.

ICM can be used to directly load the final CCC values to be used, but this technique becomes cumbersome if a large number of different configurations must be supported. Another option which is available is to use ICM to load the CCC 158 with the LIM and LCC commands enabled and all other facilities disabled. The LIM and LCC commands can then be used to load the desired CCC values in such a manner that the sequence cannot be replayed. A third option is to use ICM to load the CCC 158 with the LIM and LCC commands enabled and the PKSC signature control and PKSC TSN control set to zero. This permits the signatures for the Cosign of the LCC commands to be computed in advance.

Figure 38:
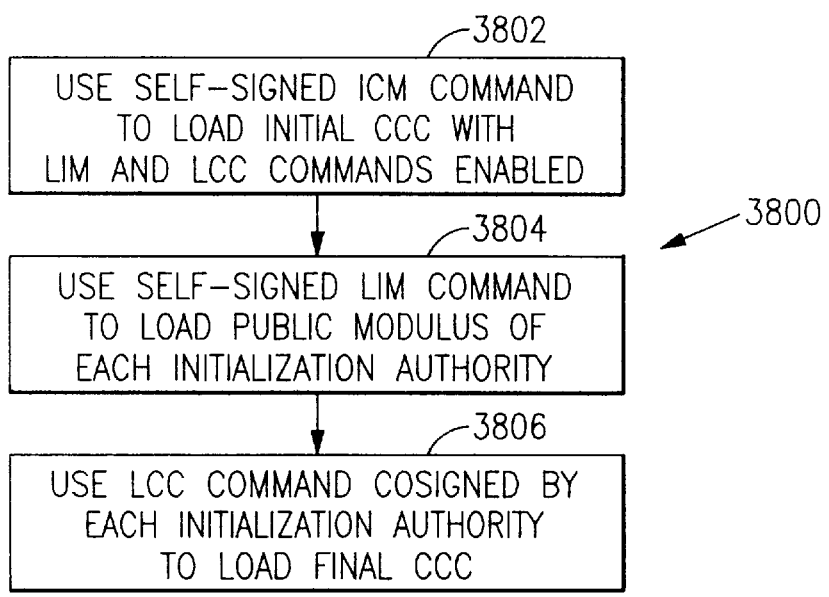
FIG. 38 shows the three-step initialization procedure using ICM, LIM and LCC commands.

FIG. 38 shows the general three-step initialization procedure 3800 described above. An authority 104 first issues a self-signed ICM command 116, signed with the secret exponent 144 (CMSE) of the crypto module 102 itself, to load an initial set of configuration bits into CCC register 158 with the LIM and LCC commands enabled (step 3802). The authority 104 then issues a self-signed LIM command for each initialization authority, signed with the secret exponent 144 (CMSE) of the crypto module 102, to load the public modulus APM of the initialization authority into a corresponding APM register 136 (step 3804). Finally, the authority 104 issues an LCC command, cosigned by each initialization authority, to load a final set of configuration bits into CCC register 158 (step 3806).

Initialize Crypto Module (ICM)

Figure 31:
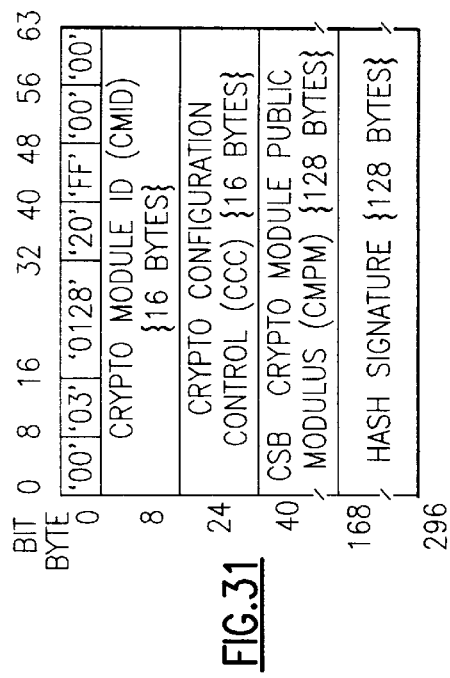
FIG. 31 shows the format of an Initialize Crypto Module (ICM) command.

FIG. 31 shows the format of an Initialize Crypto Module (ICM) command 116.

Provided that there are no special conditions, then either ICM reset or ICM load is performed, depending on the state of the crypto module 102.

If the crypto module 102 is initialized, that is, it is either in the crypto module initialized state or the PRN not initialized state, then an ICM reset function is performed. The crypto module 102 is placed in the crypto module not initialized state and the ICM reset complete abnormal reply is returned. This reply indicates that the crypto module has 102 been reset, but ICM must be issued again to load the initialization information.

If the crypto module 102 is in the crypto module not initialized state, then an ICM load function is performed. The 128-byte CSB of the message is placed in the crypto module public modulus (CMPM) 142, and bytes 24–39 of the request message are placed in the 16-byte crypto configuration control (CCC) 158. ICM never returns a normal completion reply. Instead, if the above action is successfully completed, an ICM load complete abnormal reply is returned. This reply indicates that the crypto module 102 has been initialized, but additional queries are required to initialize the pseudorandom number (PRN) generator 160.

Signature verification always applies to ICM regardless of the setting of the PKSC signature control (CCC bit 7).

Load Initialization Public Modulus (LIM)

Figure 32:
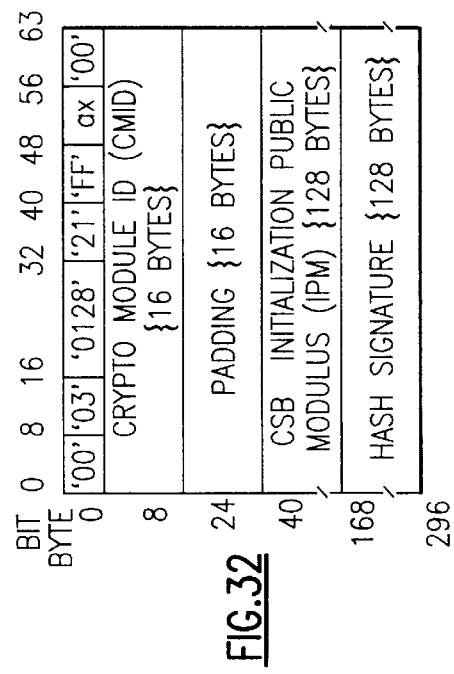
FIG. 32 shows the format of a Load Initialization Public Modulus (LIM) command.

FIG. 32 shows the general format of a Load Initialization Public Modulus (LIM) command 116.

The 128-byte CSB of the message is placed in the authorization public modulus field 136 of the authorization register 134 specified by the ax field. The bit in the IAF field of the crypto configuration control 158 corresponding to authorization register an (bit 48+ax) is set to one. A new random number is generated and placed in the TSN field 138 for the target authorization register 134.

Signature verification always applies to LIM regardless of the setting of the PKSC signature control (CCC bit 7).

Execution of Two-Signature Initialization Commands

Figure 33:
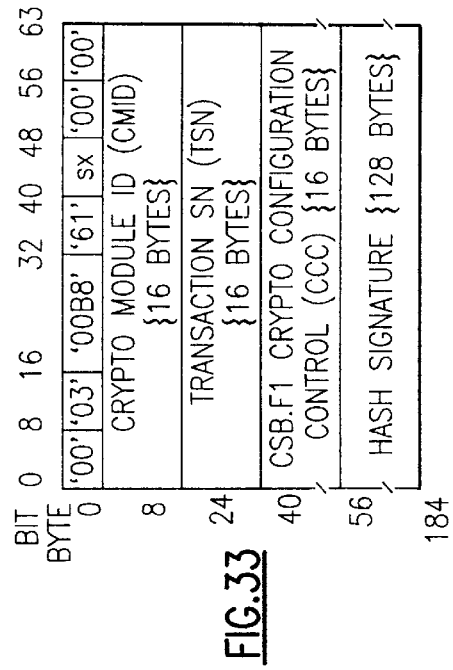
FIG. 33 shows the format of a Load Crypto Configuration Control (LCC) command.

There is only one two-signature initialization command 116: Load Crypto Configuration Control (LCC): shown in FIG. 33. Execution of LCC consists of three parts, just as the execution of multiple-signature commands consists of three parts: (1) PCR loading, (2) signature requirement checking, and (3) PCR execution. Just as with multiple-signature commands 116, the Cosign command is used to cosign the PCR 150 after the LCC command has been loaded into the pending command register, and just as with multiple-signature commands, PCR execution of LCC occurs after the signature requirements have been met.

The only difference between LCC and the multiple-signature commands 116 is in the signature requirement checking. LCC does not use the signature requirement array 156, rather LCC requires two initialization authority signatures 118. That is, the signature requirements for LCC are met when two ones in the signature summary mask (SSM) 802 of the pending command register (PCR) 150 match two ones in the initialization authority flags (IAF) field of the crypto configuration control (CCC) 158.

Upon execution of the LCC command 116, the 16-byte CSB.F1 of the message is placed in the crypto configuration control 158.

Load Authorization Public Modulus (LAP)

FIG. 34 shows the format of a Load Authorization Public Modulus (LAP) command 116.

Entry 0 of signature requirement array (SRA) 156 contains the signature requirement specifications for the LAP command.

The 128-byte CSB of the message is placed in the authorization public modulus field 136 of the authorization register specified by the ax field. The bit in the IAF field of the crypto configuration control 158 corresponding to authorization register an (bit 48+ax) is set to zero. A new random number is generated and placed in the TSN field for the target authorization register.

Load Environment Control Mask (LEC)

FIG. 35 shows the format of a Load Environment Control Mask (LEC) command 116.

Entry 3 of SRA 156 contains the signature requirement specifications for the LEC command.

The 4-byte CSB.F1 is placed in the environment control mask of the domain specified by the dx field.

Load PKSC Control Block (LCB)

FIG. 36 shows the format of a Load PKSC Control Block (LCB) command 116.

Conclusion

The invention may be implemented as any suitable combination of hardware and software or microcode (i.e., a machine-readable program of instructions tangibly embodied on a program storage devices) executing on one or more hardware machines. While particular embodiments have been shown and described, various modifications will be apparent to those skilled in the art.

What is claimed is:

1. A method for initializing an information handling system controlled by a first private signature key and a second private signature key, said first and second private signature keys having corresponding first and second public verification keys, said second private signature key being held by an initialization authority, said method comprising the steps of:

receiving a first message containing first initialization information for said system and a first digital signature generated on said first message using said first private signature key;

verifying said first digital signature using said first public verification key;

accepting said first initialization information only if said first digital signature is verified as being a valid signature using said first public verification key;

receiving a second message containing said second public verification key and a second digital signature generated on said second message using said first private signature key;

verifying said second digital signature using said first public verification key;

accepting said second public verification key only if said second digital signature is verified as being a valid signature using said first public verification key;

receiving a third message containing additional initialization information for said system and a third digital signature generated on said third message using said second private signature key;

verifying said third digital signature using said second public verification key; and accepting said additional initialization information only if said third digital signature is verified as being a valid signature using said second public verification key.

2. A program storage device readable by a machine, tangibly embodying a program of instructions executable by the machine to perform the method steps of claim 1.

3. Apparatus for initializing an information handling system controlled by a first private signature key and a second private signature key, said first and second private signature keys having corresponding first and second public verification keys, said second private signature key being held by an initialization authority, said apparatus comprising:

means for receiving a first message containing first initialization information for said system and a first digital signature generated on said first message using said first private signature key;

means for verifying said first digital signature using said first public verification key;

means for accepting said first initialization information only if said first digital signature is verified as being a valid signature using said first public verification key;

means for receiving a second message containing said second public verification key and a second digital signature generated on said second message using said first private signature key;

means for verifying said second digital signature using said first public verification key;

means for accepting said second public verification key only if said second digital signature is verified as being a valid signature using said first public verification key;

means for receiving a third message containing additional initialization information for said system and a third digital signature generated on said third message using said second private signature key;

means for verifying said third digital signature using said second public verification key; and means for accepting said additional initialization information only if said third digital signature is verified as being a valid signature using said second public verification key.

* * * * *